US010009300B2

(12) United States Patent
Cohen et al.

(10) Patent No.: US 10,009,300 B2
(45) Date of Patent: Jun. 26, 2018

(54) MESSAGING APPARATUS AND METHOD THEREOF

(71) Applicant: Wrinkl, Inc., Sands Point, NY (US)

(72) Inventors: Marc A. Cohen, Blue Bell, PA (US);
Erik S. Katz, Sands Point, NY (US);
Jeffrey A. Cohen, Blue Bell, PA (US)

(73) Assignee: Wrinkl, Inc., Sands Point, NY (US)

( * ) Notice: Subject to any disclaimer, the term of this patent is extended or adjusted under 35 U.S.C. 154(b) by 0 days. days.

(21) Appl. No.: 15/609,663

(22) Filed: May 31, 2017

(65) Prior Publication Data

US 2017/0272390 A1 Sep. 21, 2017

Related U.S. Application Data

(63) Continuation of application No. 15/293,620, filed on Oct. 14, 2016, now Pat. No. 9,712,466.

(60) Provisional application No. 62/358,719, filed on Jul. 6, 2016, provisional application No. 62/253,229, filed on Nov. 10, 2015.

(51) Int. Cl.
*G06F 15/16* (2006.01)
*H04L 12/58* (2006.01)
*H04L 29/06* (2006.01)

(52) U.S. Cl.
CPC ........ *H04L 51/046* (2013.01); *H04L 65/1069* (2013.01)

(58) Field of Classification Search
CPC ................................ H04L 51/12; H04L 51/16
See application file for complete search history.

(56) References Cited

U.S. PATENT DOCUMENTS

| | | | | |
|---|---|---|---|---|
| 7,945,620 | B2* | 5/2011 | Bou-Ghannam | G06Q 10/107 709/204 |
| 2002/0095465 | A1 | 7/2002 | Banks et al. | |
| 2007/0185961 | A1 | 8/2007 | Perlow et al. | |
| 2011/0047227 | A1* | 2/2011 | Arthurs | G06Q 10/107 709/206 |
| 2012/0017149 | A1* | 1/2012 | Lai | H04N 7/15 715/716 |
| 2014/0040784 | A1* | 2/2014 | Behforooz | H04L 65/403 715/758 |
| 2014/0067977 | A1* | 3/2014 | Rasmussen | H04N 21/440263 709/206 |
| 2014/0219433 | A1 | 8/2014 | Pai et al. | |
| 2014/0298210 | A1* | 10/2014 | Park | G06F 3/0486 715/758 |
| 2015/0188928 | A1* | 7/2015 | Shapiro | H04L 63/105 709/206 |
| 2016/0330147 | A1* | 11/2016 | Antebi | H04L 51/046 |
| 2017/0163594 | A1* | 6/2017 | Anderson | H04L 51/34 |

* cited by examiner

*Primary Examiner* — Yves Dalencourt
(74) *Attorney, Agent, or Firm* — Caesar Rivise, PC

(57) ABSTRACT

A method of providing messaging comprises the steps of providing display of messages exchanged between a plurality of participants; receiving designation of one of said messages as an anchor message; permitting a response received to said anchor message from one of said plurality of participants to be provided to all others of said plurality of participants; providing display of said response; and receiving at least a further response to said anchor message from at least one of said plurality of participants, wherein at least an excluded one of said plurality of participants is prevented from receiving at least said further response.

18 Claims, 26 Drawing Sheets

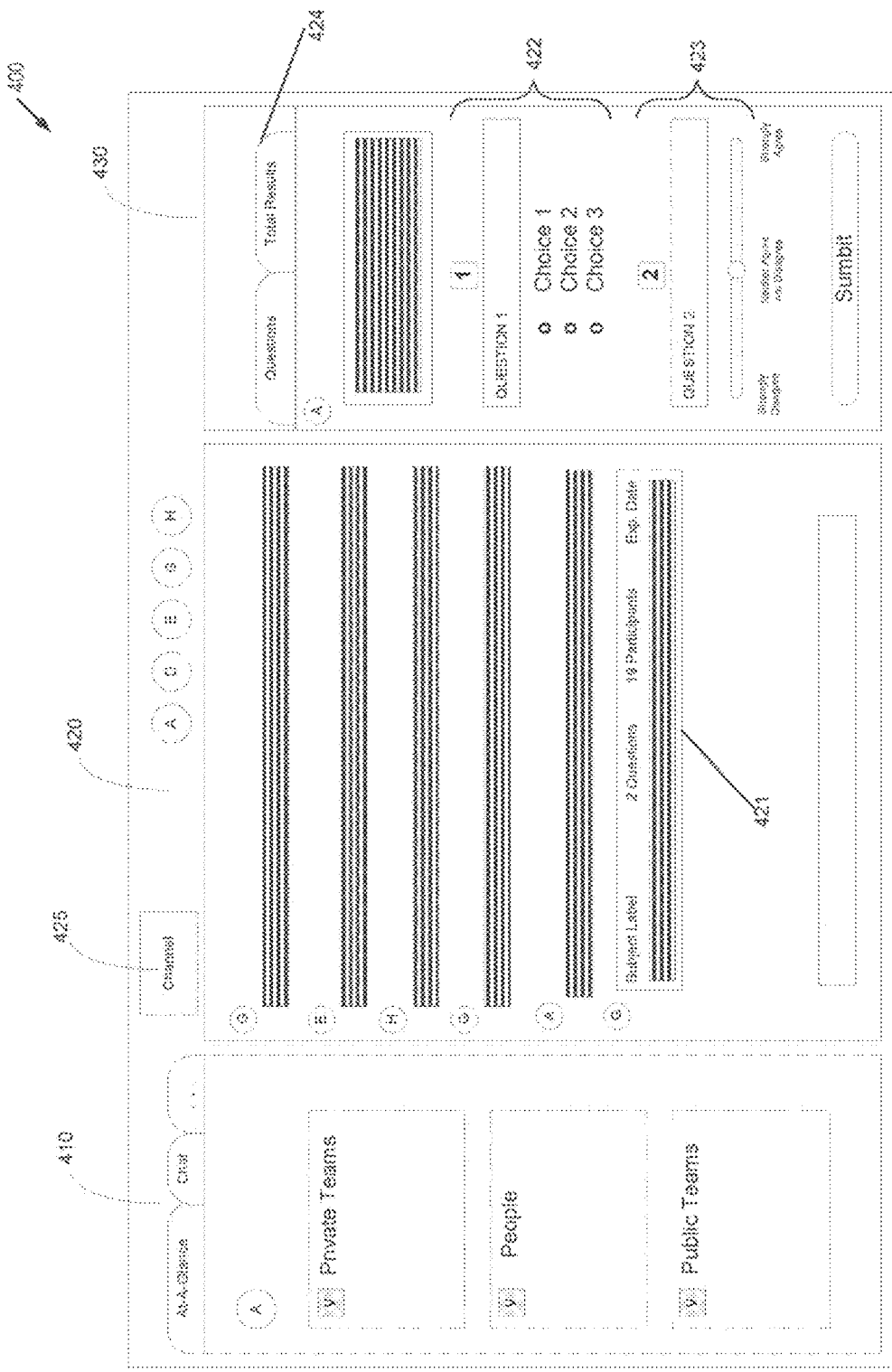

MESSAGING APPARATUS AND METHOD THEREOF

CROSS REFERENCE TO RELATED APPLICATIONS

This application is a continuation of U.S. patent application Ser. No. 15/293,620, which claims the benefit under 35 U.S.C. 119(e) of U.S. Provisional Application No. 62/358,719, filed Jul. 6, 2016, and U.S. Provisional Application No. 62/253,229, filed Nov. 10, 2015, the entire disclosures of all of which are incorporated by reference herein.

TECHNICAL FIELD

Implementations of the current disclosure relate generally to real-time electronic communications, and more specifically, for integrating actionable objects into an on-line chat communications platform.

BACKGROUND

Electronic chat communications (which include chat room communications, instant messaging and text messaging, etc.) are an increasingly popular way for two or more people to communicate on-line in virtual real time. For example, chat sessions for conveying a quick note are often used in the workplace in lieu of have a phone call with multiple individuals. In some situations, an ability to quickly communicate with more than one person using chat communications often saves time and avoids costly mistakes in collaborative efforts, such as team projects. When multiple people, however, are participating in a chat session that may be established for a large project, current electronic chat communications are limited due the sequential, read-only, chronological presentation of exchanges between individuals or groups individuals associated with the electronic chat session.

BRIEF DESCRIPTION OF THE DRAWINGS

The disclosure is illustrated by way of example, and not by way of limitation, and will become apparent upon consideration of the following detailed description, taken in conjunction with the accompanying drawings, in which like reference characters refer to like parts throughout, and in which:

FIGS. 4A-4E are examples illustrating an interactive interface portal in accordance with aspects of the disclosure.

DETAILED DESCRIPTION

Figure 1:
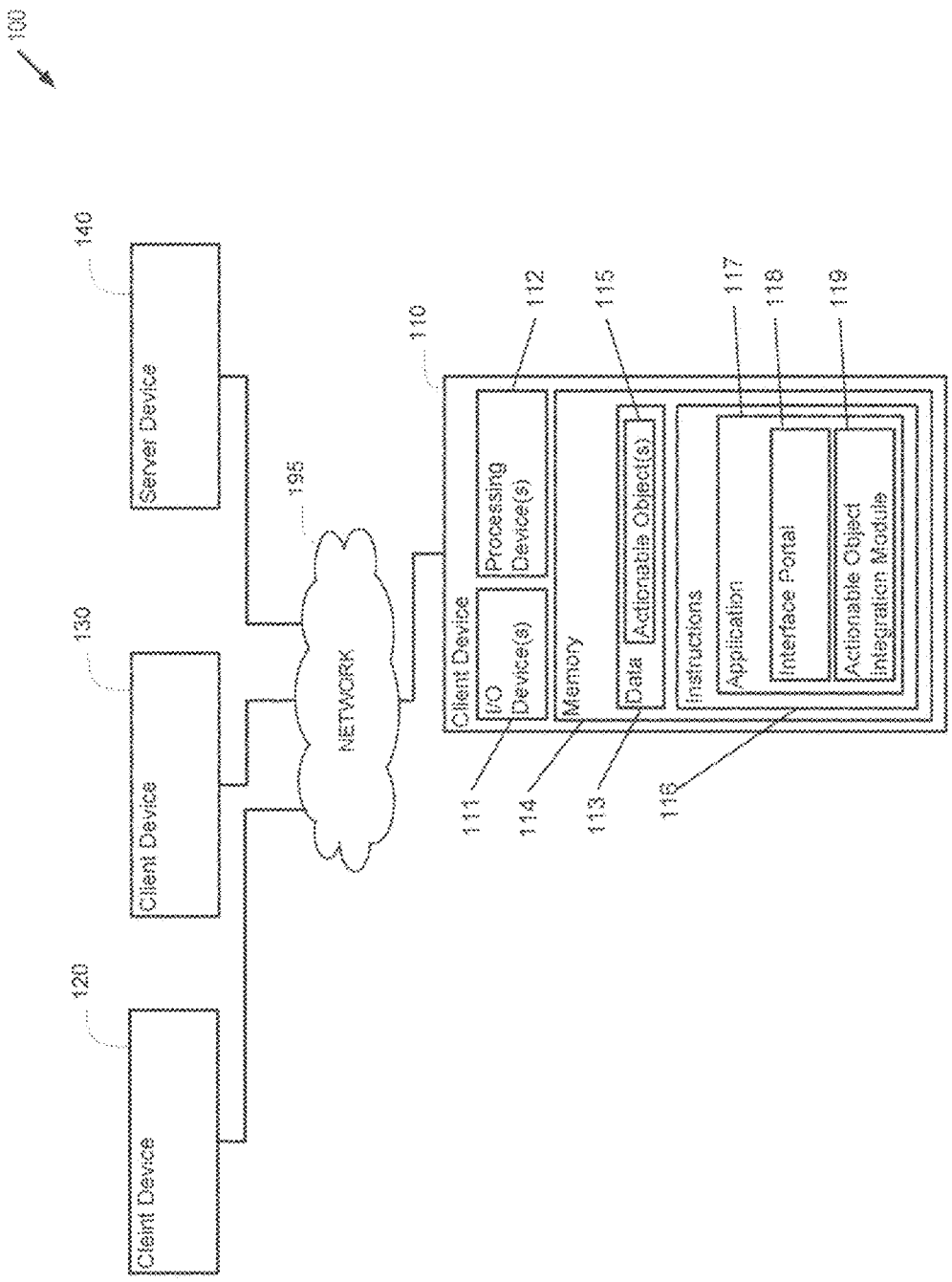
FIG. 1 is a block diagram illustrating a system in which implementations of the disclosure may operate.

Implementations of the disclosure provide techniques for integrating actionable objects into an on-line chat communications platform. This may be advantageous in improving chat messaging technology by providing user perceivable actionable objects in a chat session that are executed by a client device to enhance communications between participants of the session.

To communicate typically, various different mediums use a number of different applications resulting in a loss of context and continuity in the communications. For example, some users may not be able to keep track of whether a message that was sent to or received from another user using different modes of communication (e.g., chat/email, etc.). In such cases, there is no organization flow associated with the messages nor is it possible to determine a response came before or after another message sent or received. Furthermore in traditional chat technology, information is extremely perishable. For example, once a message is off the top of the screen, it is rarely seen again, thus making it even harder to maintain the context of the message stream.

In accordance with the present disclosure a system is provided that is intended to be used as a system of record for an organization, work group, social group, etc., using various combinations of communication techniques. In some aspects, the system addresses the problems in chat technology of disjointed, ad hoc electronic communications. For example, by allowing one-to-one private messaging within a group chat channel this disclosure addresses a common problem of reply-to-all clutter while retaining context and continuity (place, time, meaning), and the flow of the conversation for each unique user. Further, by integrating a system of identifying and grouping together past messages from within a channel and even allowing those messages to be combined with other past messages from other channels, this disclosure addresses the problem of discussion archival and retrieval and by further still integrating actionable objects such as "Tasks", "Ideas", "Events", "Surveys", etc., into the system. This allows messages (e.g., chat messages) to be "typed" making them organized, searchable, referenceable, context oriented and actionable thereby enhancing communications, saving time and increasing productivity of users. The elements of this disclosure provide additional advantages that are further enhanced when the elements are combined and integrated together making possible a comprehensive and dynamic system of record. In some implementations, the disclosure can be implemented in accordance with numerous aspects consistent with the techniques presented herein.

Although implementations of the disclosure may be particularly beneficial in certain types of communication platforms (e.g., chat room communications), other types of communication platforms can be utilized in conjunction with the disclosure. For example, some of these communication platforms may include platforms for text messages, short message services (SMS), e-mails and other types of similar on-line communication platforms for facilitating information exchanges between client devices of a plurality of participants.

In the following description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to a system for performing the operations herein. This system may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

In some implementations, the computer program product, or software may include a non-transitory machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

In one implementation, the computer program product may be installed and/or a service may be selected from a cloud-computing environment in order to obtain the benefits of the techniques described herein. In an implementation, the computer program product may be downloaded onto a client device. For example, a participant may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser.

I. Example Systems

FIG. 1 is a block diagram illustrating a system 100 in which implementations of the disclosure may operate. In some implementations, the system 100 may facilitate the transfer of electronic communications between computing devices of two or more users or participants over a communication network. The system 100 can include one or more servers (e.g. server device 140), which provide access or a communication link between a plurality of client devices (e.g., client devices 110, 120 and 130) in order to facilitate communication between two or more client devices.

As shown in FIG. 1, the system 100 may include a plurality of client computing devices, such as client devices 110, 120 and 130, coupled to network 195, and one or more server computing devices, such as server device 140, capable of communicating with the client computing devices 110, 120 and 130 over the network 195. In some implementations, the network 195 may be a private network (e.g., a local area network (LAN), Wi-Fi, Bluetooth, Radio Frequency), a wide area network (WAN), intranet, etc.), or a public network (e.g., the Internet).

Server device 140 may be at one node of network 195 and capable of directly and indirectly communicating with other nodes of the network 195. For example, the server device 140 may include a web server that may be capable of communicating with client devices 110, 120 and 130 via network 195 such that it uses the network 195 to transmit and display information to a participant on a display associated with client devices. In some implementations, the server device 140 may also include a plurality of computers that exchange information with different nodes of a network for the purpose of receiving, processing and transmitting data to the client devices 110, 120 and 130.

Referring to FIG. 1, the computing devices of system 100, such as client device 110, may include one or more I/O (input/output) devices 111, processors 112, memory 114, and other components typically present in general purpose computers. "Processor" or "Processing device" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 112 is depicted in FIG. 1, in some other implementations computer system 100 may comprise a plurality of processors. Similarly, in some other implementations computer system 100 may comprise a plurality of I/O devices, rather than a single I/O device 111.

Instructions 116 of the client device 110 may be a set of instructions to be executed directly (such as machine code) or indirectly (such as scripts) by the processor 112. In that regard, the terms "instructions," "steps" and "programs" may be used interchangeably herein. The instructions 116 may be stored in object code format for direct processing by the processors 112, or in another computer language including scripts or collections of independent source code modules that are interpreted on demand or compiled in advance.

Data 118 may be retrieved, stored or modified by processors 112 in accordance with the instructions 116. For instance, although the present disclosure is not limited by a particular data structure, the data 118 may be stored in computer registers, in a relational database as a table having a plurality of different fields and records, XML documents, or flat files. The data 118 may also be formatted in a computer-readable format such as, but not limited to, binary values, ASCII or Unicode. By further way of example only, the data 118 may comprise information sufficient to identify the relevant information, such as numbers, descriptive text, proprietary codes, pointers, references to data stored in memory or information that is used by a function to calculate the relevant data. For example, the data 118 may include actionable objects 115 that may identify user perceivable action that can be included in a chat session.

Each of the actionable objects 115 may comprise an adjustable data structure (e.g., a memory array) comprising a plurality of fields that characterize a type category to associate with a chat message. By incorporating the actionable objects 115 into the creation of the chat messages, the system 100 is able to ascribe a value "type" to each message. In one implementation, when one or more actionable objects 115 are added or inserted into a chat message of the chat session, the actionable object executes a series of steps to be performed by a corresponding user perceivable action. The series of steps can be preprogrammed or variable based on the context of the type category for that action.

In some implementations, each client device may include an application 117 to facilitate different types of electronic communications between each client device and one or more other client devices via network 195, including providing interactive interface portals 118 for facilitating various operating functions of the disclosure. In one implementation, the application 117 may be installed and/or a service may be selected in order to obtain the benefits of the techniques described herein. In an implementation, the application 117 may be downloaded onto the client device 110. For example, a participant may elect to download the application from a service associated with an online server. The client device 110 may transmit a request for the application 117 over network 195 and, in response, receive the application 117 from the service.

The application 117 may be installed locally on the client device 110. Alternatively, the application 117 can be stored at the service and may be accessed through the client device 110, for example, via a mobile web browser. By using the application 117, the client device 110 may integrate into a chat session user perceivable actionable objects, such as actionable objects 115, which can be executed by the client device 110 to enhance communications between participants of that session. In an alternative implementation, the application 117 may be a firmware embedded in communication device.

As shown in FIG. 1, the instructions 116 may include an interface portal 118 for displaying network data and to allow a participant associated with the client device 110 to interactively navigate over the display of data. The interface portal 118 provides for the display of network content, such as chat messages of a chat session or any other type of network data, to an I/O device 111 (e.g., a touch screen display) of the client device 110 by sending and receiving data across the network 195. The network data may be received in response to a transmitted chat message that includes one or more actions objects 115.

To facilitate integrating actionable objects into a chat session, the instructions 116 of the client device 110 may include actionable object integration module 119. The actionable object integration module 119 may generate and transmit user perceivable actionable objects in a chat session that can be executed by the client devices of system 100. The functionality of the module 119 can exist in a fewer or greater number of modules than what is shown, with such modules residing at one or more computing devices, which may be geographically dispersed. The systems may be operable in conjunction with components of the client device 110 from which it may receive chat message related data and other relevant information regarding the device 110.

Figure 2:
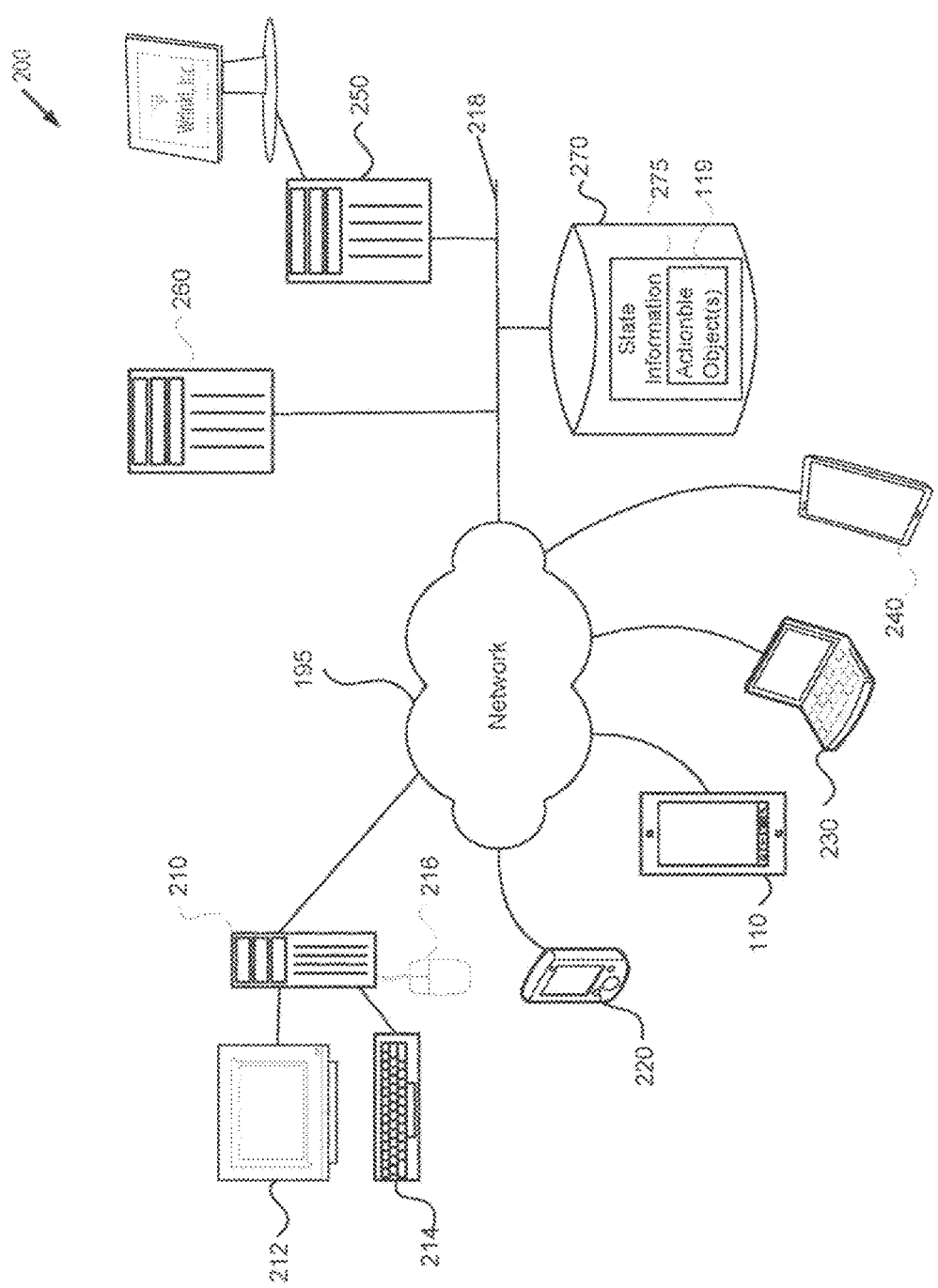
FIG. 2 is a pictorial diagram of a system including a plurality of client devices in accordance with aspects of the disclosure.

FIG. 2 is a pictorial diagram of a system 200 including a plurality of computing devices in accordance with aspects of the disclosure. In some implementations of system 200 two or more computing devices (e.g., participant/client devices) may engage in an electronic communication session (e.g., chat session) with each other. In some implementations, a first participant/client device may engage in a chat session with a second participant/client device via a network 195. As shown, FIG. 2 illustrates network 195 having a plurality of computing devices, such as client device 110, and other types of computing devices, a base station 210, a personal data assistant (PDA) 220, a laptop/netbook 230 and a tablet 240 as well as computing server devices 250 and 260 (e.g., computing devices that can be located at a number of different receiving stations). The various devices may be interconnected via a network or direct connection 218 and/or may be coupled via a communications network 195 (e.g., a LAN, WAN, the Internet, etc. that may be wired or wireless). In some implementations, the computing devices may communicate with each other before accessing the communication network 195.

Each device may include, for example, user input devices such as a keyboard 214 and mouse 216 and/or various other types of input devices such as pen-inputs, joysticks, buttons, touch screens, etc., as well as a display, which could include, for instance, a CRT, LCD, plasma screen monitor, TV, projector, touch screen, etc. Each device may be a personal computer, application server, etc. By way of example only, computing device 110 may be a mobile phone while computing device 260 may be a server. Databases, such as database 270, may be accessible to one or more of the computing devices or other devices of system 200. The database 270 may comprise data, such as state information 275, associated a chat session implemented on the client devices as well as store chat messages transmitted via system 200.

In one implementation, a resource associated with the system 200 may be used to maintain a consistency of the state information 275 and in such cases when there is a system failure. This is so that the chat session can continue uninterrupted without losing chat participant details. For example, a state manager (not shown) may maintain and transfer the state information 275 to state backup storage (not shown) for later retrieval. State backup storage may be accessible by any of the computing devices of system 200 via network connection 218 so that the chat session between the participants may be rerouted while the state information 275 is maintained, if a computing device of system 200 fails.

In some implementations, the state information 275 may correspond to a chat session between participants associated with the client devices of system 200. In some implementations, the state information 275 may be stored in database 270 by the state manager running on the server device 260 and/or the client devices or some combination thereof. In one implementation, the state information 275 may include, for example, information regarding the identity of participants of the chat session, the number of chat participants, actionable objects 119 that are applied to the chat session, a unique identifier associated with each of the action objects 119 and/or the chat message or session, and an order in which chat messages are received as well as other relevant information. When an actionable object 119 is applied in a particular chat session, the state information 275 for that session may be updated in accordance with the user perceivable action associated with the actionable object 119. This updating of the state information 275 in accordance with the actionable object 119 applied therein is further discussed below with respect to various interactive interfaces of the disclosure.

II. Example Interactive Interfaces

Embodiments of the disclosure provide actionable functionality to the contents of chat messages to distill and extract central elements of a single, one-to-one or group chat conversation. A participant of the chat sessions may be provided with a variety of different interactive interfaces to facilitate the transfer of an electronic communications between participants in a chat session. In some implementations, the interfaces allow the participants to integrate actionable objects, such as actionable objects 119 into the chat session to enhance the electronic communications between the participants. The interfaces may be flexibly configured to include various types of buttons, cursors, and tools as well as formatted content on a display on a client device. In one implementation, an application, such as application 117 of FIG. 1, on the client device of the participant may present the participant with a graphical user interface (GUI) that allows the participant to direct messages comprising the actionable objects 119 to other selected participants of the chat session.

Figure 3:
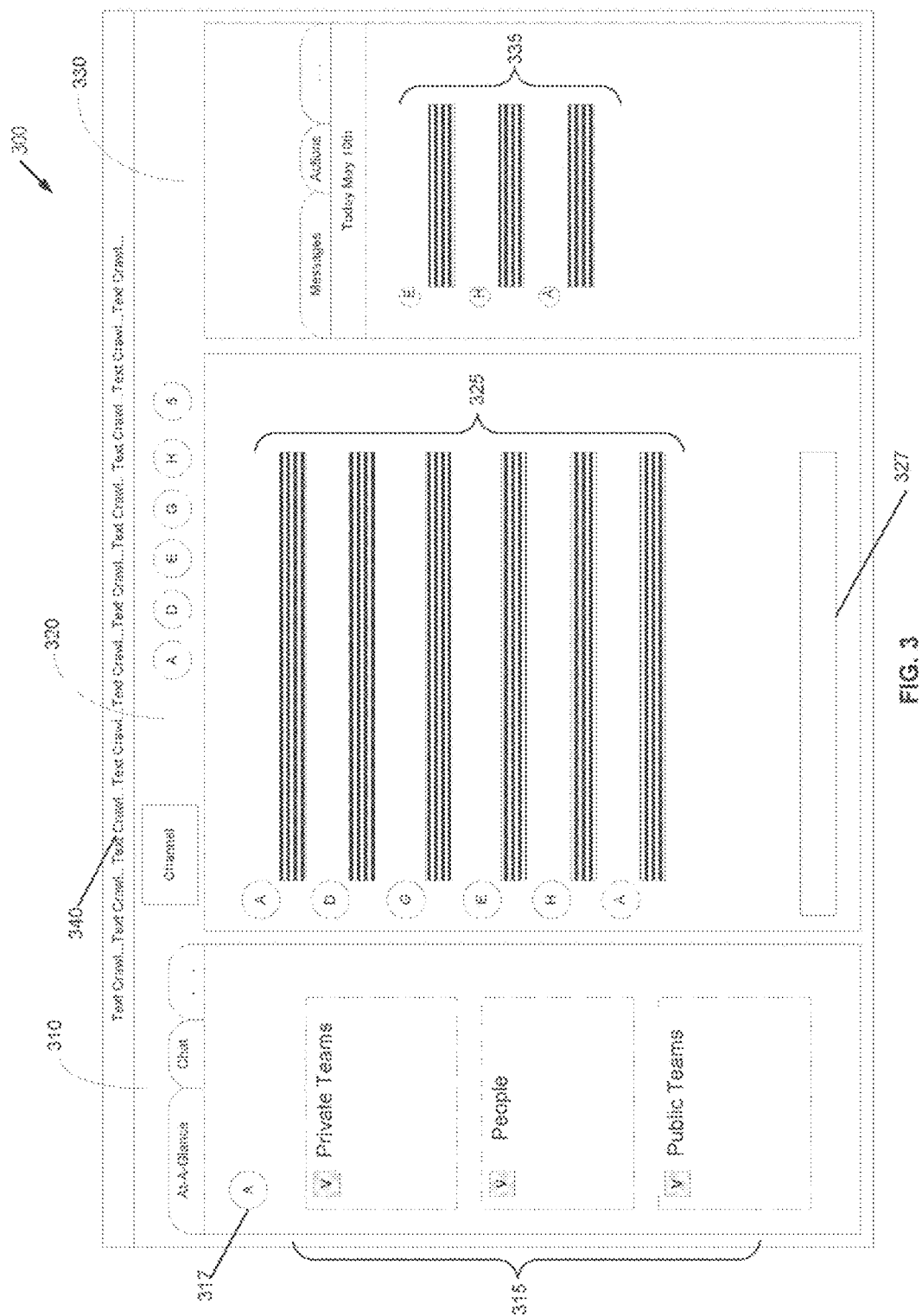
FIG. 3 is an example of a landing interface portal of a client device in accordance with aspects of the disclosure.

With regards to FIG. 3, an example of a landing interface portal 300 of a client device is shown. In some implementations, the landing interface portal 300 may correspond to the interface portal 118 in system 100 of FIG. 1. The landing interface portal 300 provides an example interface in which a chat messaging session can be engaged by a number of participants that are represented by the participant icons A-H on the portal 300. In some implementations, the interface portal 300 may include several panels that include a channel/dialog panel 310, a message window panel 320 and a side panel 330. The channel/dialog panel 310 displays the different chat session groups 315 that a particular participant 317 has joined. The message window panel 320 displays the chat messages 325 exchanged by the participants. In some implementations, the message window panel 320 also includes a count of the current participants 323 and a text entry region 327 that allows the participants to insert and reformat the text (i.e., bold, italics, color), add a link (hypertext link) or file, or insert an actionable object or bundle communications into a chat session. The side panel 330 can be adjusted to dynamically display elements regarding various messages or groups of messages 335 and other information to the actionable objects as disclosed herein.

Each message that is entered into the text entry region 327 is displayed in the message window panel 320. In some implementations, the messages 325 can be flagged or marked (for example, by color) to isolate the message for later use. An advantage of marking individual messages is that it provides participants with a way to indicate, highlight or associate messages, for current use or future recall for themselves or others.

In some implementations, the interface portal 300 provides context relevant searching to display messages that match an inputted search criterion while simultaneously affording the search originator necessary message context. In one example, the participant taps on a control associated to a particular message in the message window 320 to bring up a palette of color tags. One or more colors may be used to tag the message. The user can select, add, delete and name colors in user settings. In some implementations, the search criterion can be typed, tapped, moved, imported, loaded from a saved file, written, spoken (entered by any known means) through the interface portal 300. The search criterion can be a single or combination of and/or Boolean search term (word, #tag, name, color, texture), color tags that may be defined and/or reserved. In one implementation, the context relevant searching allows for the discovery of messages that come before and after the "found" instances ("context") to enhance search results. For example, when a User selects a found message, the message is displayed (for example, in the side panel 330) with messages that came immediately before and immediately after that message.

In some implementations, from time to time a user may wish to initiate or continue a dialog/thread/conversation with another member and may want to quickly identify all of the "mutual" chats/conversations, that is, chats they have in common with the other person. Quickly ascertaining mutual chats can save time and frustration for chat participants. In accordance with the present disclosure, a user can ascertain mutual chats, which allows the user to switch between chat groups, dialogs, threads or conversations. For example, the user can activate a control on a particular message in the message window 320 that in turn displays a list of "mutual" dialogs/conversations (e.g., in the side panel 330.) User can then select any dialog from the list to immediately switch to that conversation to be displayed in the message window 320.

In some implementations, the interface portal includes a text crawl region 340 where messages sent to one or more intended recipients are displayed. The text crawl region 340 may contain text, graphics, sounds or recorded messages (or any combination thereof). The text crawl region 340 can be placed, sized and/or moved to call attention or notice to the participants of the messages. For example, the text crawl region 340 may be enlarged, shrunken, hidden, tagged, named, saved, deleted, forwarded, edited, or remain a static size, random size or variable. Text and/or graphics the text crawl region 340 of the can appear in any color or combination of colors.

Users may have the option of defining the types and conditions under which they will accept, view or have the text crawl region 340 visible to them. A text crawl may be accompanied by a sound or vibration. Associated sounds can be varied depending upon the context and/or content and/or originator of the crawl. Some crawl message can be generated as a result of a subscription, membership or affiliation (e.g., based on defined criteria and linked to a social media account, feed or the like). Text crawl messages may also be automatically generated based upon certain criteria being met such as, for example, a location or proximity to a person, place, thing or an event, date or time. The crawl can be spawned by other third party applications as a result of a search being performed, an inquiry made or a purchase being made. In some implementations, text crawl can be a reminder, an alert, a message, an advertisement, an award, a receipt, a ticket, or other indication. A hypertext or other link can be embedded in the text crawl region 340. By moving a mouse cursor on the text crawl region 340 or selecting a particular message in the region 340 more information relating to the text crawl may be revealed and acted upon.

In some implementations, the text crawl may include a listing of text that meets a search criterion. For example, when by interacting with the text crawl region 340 (e.g., with a mouse cursor), the search criterion may automatically include all messages/objects that are tagged as "Crawl" objects. In one implementation, the search may be further refined to include text crawl messages that are included in the dialog chat messages between participants. Initially, the text crawl region 340 may display messages from a particular work group (e.g., that is subscribed to, accepted or originated by a current user to public or social or unknown users). Users may turn on or turn off the text crawl region 340 and can further set parameters such as (but not limited to) the type of crawls the user is willing to accept to be displayed in the text crawl region 340

In some implementations, crawl "objects" are tagged and can be linked to a single dialog or more than one dialog in the chat message panel 320. The crawl objects can be sent to one or more recipients, such as registered and non-registered participant. Some participant may receive a notification of the crawl object through mechanisms other than the interface portal 300, for example, email, text message or other mechanism. A link may be provided in the notification directing the participant to activate the crawl object. If the email or chat software of the recipient is capable with the interface portal 300, the crawl message may be displayed from within the recipient's email or chat service.

In some implementations, the creator of the crawl message may have the option to name the crawl message. The color of the text may be selected and can vary from character to character. The crawl message creator may choose to animate the text (e.g., text flashing). When receiving a crawl notification for the first time, the recipient may be prompted to with several options, such as to "Accept Crawls from the Sender Once, Reject Crawls from the Sender Once, Always accept Crawls from the Sender or Never accept crawls from the Sender." The settings for the text crawl region 340 of interface portal 300 regarding crawl notifications may be set and later modified by the recipient.

III. Chat with Actionable Objects

FIGS. 4A-4E are examples illustrating an interactive interface portal 400. For example, the interface portal 400 may correspond to interface portal 118 of system 100 in FIG. 1. Interface portal 400 may be compared to interface portal 300 of FIG. 3. For example, the interface portal 400 includes several panels that include a channel/dialog panel 410 (which may be compared to channel/dialog panel 410, a message window panel 420 (which may be compared to message window panel 420) and a side panel 430 (which may be compared to side panel 330). The interface portal 400 provides an example interface in which a chat messaging session can be engaged by a number of participants that are represented by the participant icons A-H on the portal 400. In this example, the interface portal 400 allows participants to integrate user perceivable actionable objects in a chat session channel 425, which can be executed by a client device to enhance communications between participants of the session channel 425. In some aspects, by integrating actionable object such as "Tasks", "Ideas", "Events", "Tokens", "Surveys", etc., into chat channels, it allows messages (e.g., chat messages) to be organized, searchable, referenceable and context oriented to enhance communications and increase productivity of users.

Figure 4A:
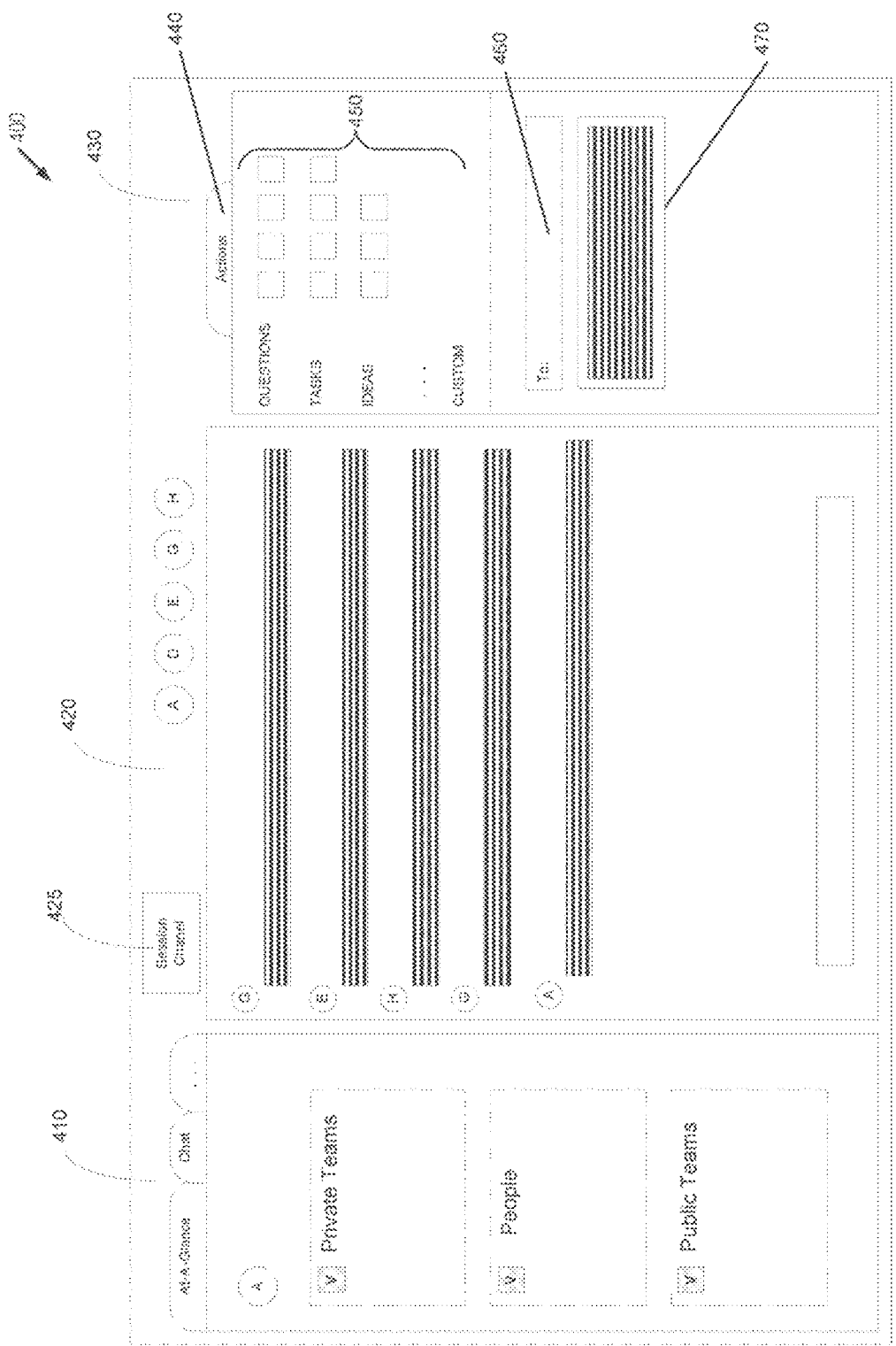

In some implementations, a control (e.g., a window tab) on the portal 400 may be activated to display a listing of actionable objects 440 that can be utilized. For example, as shown in FIG. 4A, the listing of actionable objects 440 can be display in the side panel 430 of the interface portal 400. Each actionable object 440 corresponds to a data structure, such as actionable object 115, which may include a type category indicator to characterize a user perceivable action associated with the actionable object. For example, the type categories may include, but are not limited to, a question indicator, a task indicator or an idea indicator, a finance indicator, a tokens indicator, a custom category indicator and various of type of indicators associated with a work group or participants of a chat session. When one or more of the actionable objects 440 are added or inserted into a chat message of the chat session, the actionable object executes a series of steps to be performed by a client device executing a corresponding user perceivable action. The series of steps can be preprogrammed or variable based on the context of the type category for that action.

Each actionable object 440 is associated with one or more data structures that provide enhanced functionality to chat communications. In some implementations, a user may select an icon, such as one of icons 450, associated with an actionable object to insert into the chat session. An advantage of inserting the actionable object 440 into chat messages is that it provides the basis of order and structure to the chat session to provide an interactive presentment of messaging activity. In some implementations, the actionable object 440 can be selected using various mechanisms, such as such as keyboard shortcuts.

Responsive to the selection an actionable object to insert into a chat session, at least one participant of a plurality of participants may be associated with the actionable object. For example, a user may add one or more participants to a dialog box 460 of the interface portal 400. The association indicates that the actionable object is directed to the identified participants, which may be presented on the participant's client device when the actionable object is transmitted, for example, by using network 195. In one implementation, the interface portal 400 provides a text input section 470 that may be used to add additional information 470 regarding the user perceivable action to be executed in accordance with the selected actionable object.

When a participant, via the interface portal 400, creates and sends a communication including the actionable object to the client device of a receiving participant, the receiving participant receives the communication (e.g., in the form of an actionable object control) in the chat session in which the participants are currently engaged. The application, such as application 117 of the receiving client device acts to initiate or enable the actionable object at the receiving participant end by executing the user perceivable action associated with the object. In this regard, the sending participant by sending the actionable object is requesting to escalate the chat session to a more content enriched form of communication. A recipient participant can activate the actionable object control or activate a communication session at the recipient client device in accordance with the user perceivable action of the actionable objects 440.

In some implementations, the actionable objects 440 may be used in combination. For example, the interface portal 400 may receive a selection of additional actionable objects from the plurality of actionable objects and combine these additional actionable objects with the actionable object in the chat session. The combination may change the characteristics of the user perceivable action to be performed based on a relative order of the inserted actionable objects 440 and other actionable objects 440 appearing elsewhere in the message flow of the chat session.

In one example, the interface portal 400 may detect the presence of two or more task type actionable objects, separated by three question type actionable objects. In this example, the order and/or grouping of the actions performed by the client device with regards to the questions may be adjusted. For example, the interface portal 400 may detect that one question objection has been inserted, which causes the portal 400 to prompt the user for further information. In some implementations, the presentation, input, characterization, appearance, or non-appearance of the actionable objects can vary based on the combination (or absence of) various actionable objects in a specific chat messages and/or chat session.

A. Question Objects

Figure 4B:
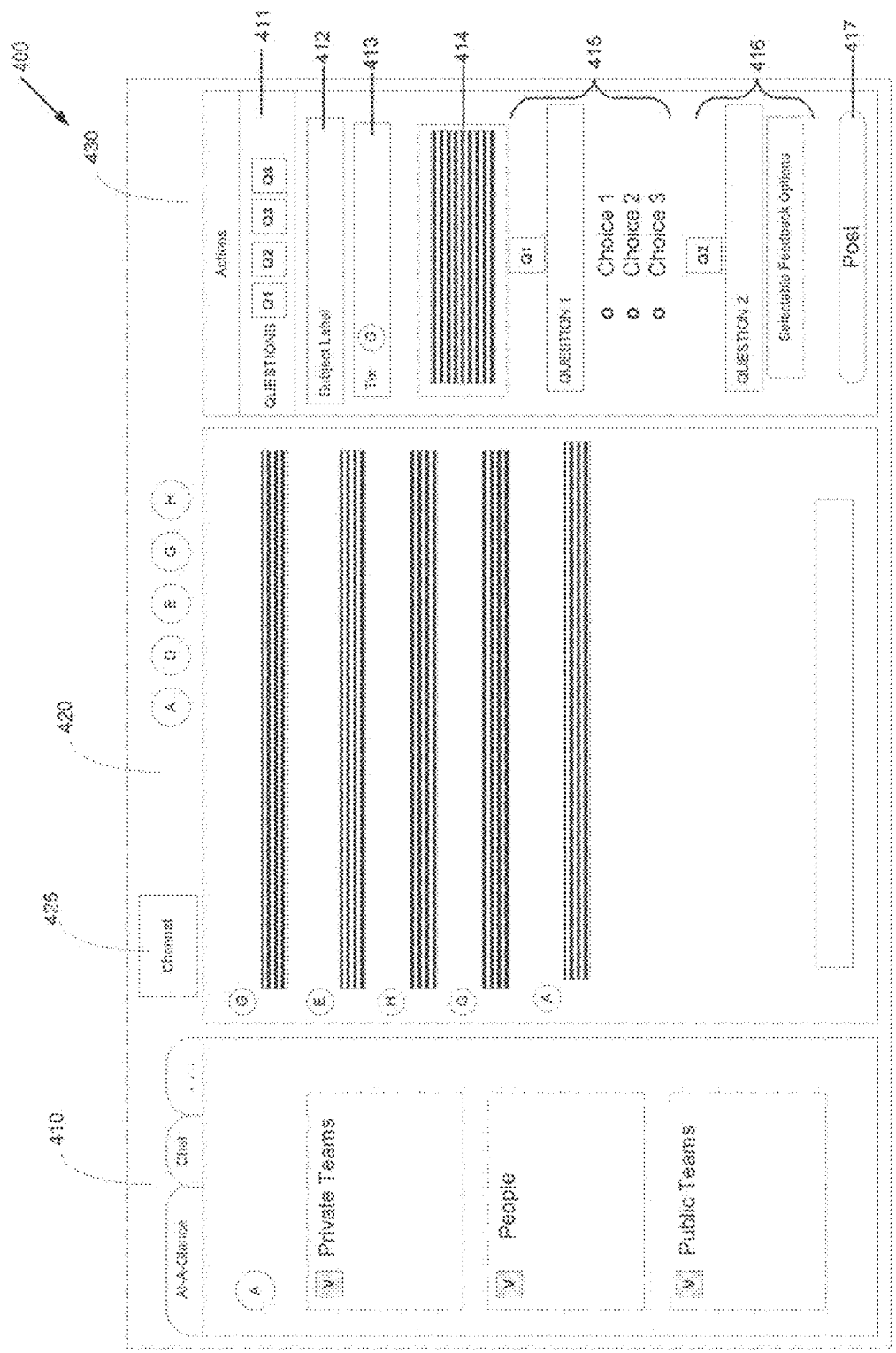

Turning to FIG. 4B another view of the interactive interface portal 400 is shown. In this example, if the user selects the question actionable object, the interface 400 may adjust the side panel 430 to provide characteristics relating to a specific type of survey question. For example, the user seeks to add a question to their message to poll for responses from other participants to a chat session in a particular form. When the sending participant initiates this actionable object, several fields are displayed in the side panel 430 in which the sending participant can characterize certain aspects of the question actionable object. As shown in FIG. 4B merely as an illustrative example, these fields may include, a plurality of control objects 411 to select a particular question for the chat session, a label field 412, a recipient field 413 to add particular recipients, a message field 414 as well as other relevant fields regarding the polling question.

In some implementations, the plurality of control objects 411 allows the sending participant to select a combination of different polling questions to provide to the chat session. In one implementation, the particular questions may be displayed in a questions region, such as questions region 415 and 416, of the side panel 430 for further adjusts by the sending participants. Although only two question regions are shown in FIG. 4B, the interface portal 400 may include a number of additional questions regions for configuring polling questions in the side panel 430.

In some implementations, these polling question actionable objects may include, but not limited to, 1) a multiple/single choice object, 2) a ranking object, 3) a slider object, and 4) a narrative response, etc. If the multiple/single choice object is selected, this object provides one or more customizable fields. This object also allows the sending participants to upload, via the interface portal 400, a media or other file which is associated with the specific choice, such as choice 1 2 or 3 in questions region 415, which can be presented with the polling question. If the ranking object is selected, this object inserts or references a polling question into the side panel 430 along with inputted configuration settings on how the chat session is to display, categorize, and associate this polling question with regards to other polling questions in the chat session.

If the slider object is selected, the object inserts or references a polling question into the side panel 430 along with pull-down menu options (as shown in questions region 416) to allow the individual to customize selectable feedback options. For example, the selectable feedback options may include a determined list of slider attributes to allow the sending participant to customize the slider left, center and right attributes (e.g., Strongly Agree, Neither Agree nor Disagree or Strongly agree) to correspond with responses from the receiving participant. It should be noted that this is merely a few examples as other polling questions and question settings can be customized by the sending participant. An advantage of providing a slider object that can be incorporated into the chat session is that the responses can be structured and also viewed numerically (e.g., with reference to a specific position along a slider) as opposed to receiving unstructured narrative responses from the receiving participants that may be difficult to interpret.

In some implementations, the question actionable object can be associated or assigned to one or more receiving participants. For example, information regarding the receiving participants may be inserted into recipient field 413. In one implementation, the sending participant may send the question actionable objects to receiving participants in the chat session by activating a control 417 on the interface portal 400. In some implementations, the receiving participants of the polling question can include members and non-members of the chat session, or another team or participant in the chat system that is not in the chat session. In one implementation, non-members may be notified by through an electronic transmission, such as email that a polling question is waiting. A link may be provided in the email notification directing the non-member to move into a browser to view/participate in the polling question. In addition to being notified that a polling question is waiting, the non-member may be provided with other information regarding the polling question, such the identity of the sending participant. The link to the polling question may remain active until a determined period of time, such as an expiration date for the polling questions set by the sending participant.

Once the fields of the selected polling question actionable objects in the side panel 430 are completed, the sending participants may preview the objects before submitting them to the chat session. The polling question actionable objects are then embedded in the chat message as a "structured" data object that can be executed by the client device of a receiving participant. In some implementations, the objects of the side panel 430 can be associated or assigned to one or more receiving participants. For example, information regarding the receiving participants may be inserted into recipient field 413. In one implementation, the sending participant may send the polling question actionable object to receiving participant in the chat session by activating a control 417 on the interface portal 400. In some implementations, the receiving participants may configure certain preferences regarding receiving polling question actionable objects, such as a type of polling questions the participant is willing to accept, a minimum compensation for accepting and/or answering the polling questions, etc.

Responses to the polling questions by members as well as non-members are made available to the sending participants and other authorized members of the chat session. The sending participant may choose whether to make the results available to a respondent immediately after the respondent responds to the polling questions or only once the expiration date and time has passed. In some situations, the sending participants can reward the receiving participants with recognition points or other type of tokens that will be discussed later in the disclosure.

In FIG. 4C, another view of the interactive interface portal 400 is shown. In this example, a receiving participant in the chat session may receive a control object 421 that can be activated to display the polling questions, participant information, expiration dates, etc., and be provided with the options for responding. In some implementations, the control object may be highlighted with version colors to indicate that the polling questions are reaching an expiration date in which responses can be received. The receiving participant may selectively execute (e.g., by clicking on the object on the display) the control object 421 to view and respond to the polling questions. In some implementations, the side panel 430 may display in a polling region, such as polling regions 422 and 423, the polling questions and options for the recipient to respond. In alternative implementations, the polling questions and options may be included in the main window 420 of the interface portal along with messages in the chat session. When a determined number of the receiving participants have responded, the sending participant may receive the results, for example, as a message within the same chat session, in a results section 424 of the side panel 430. These results of the polling question can also be shared with the other participants.

B. Task Objects

Figure 4D:
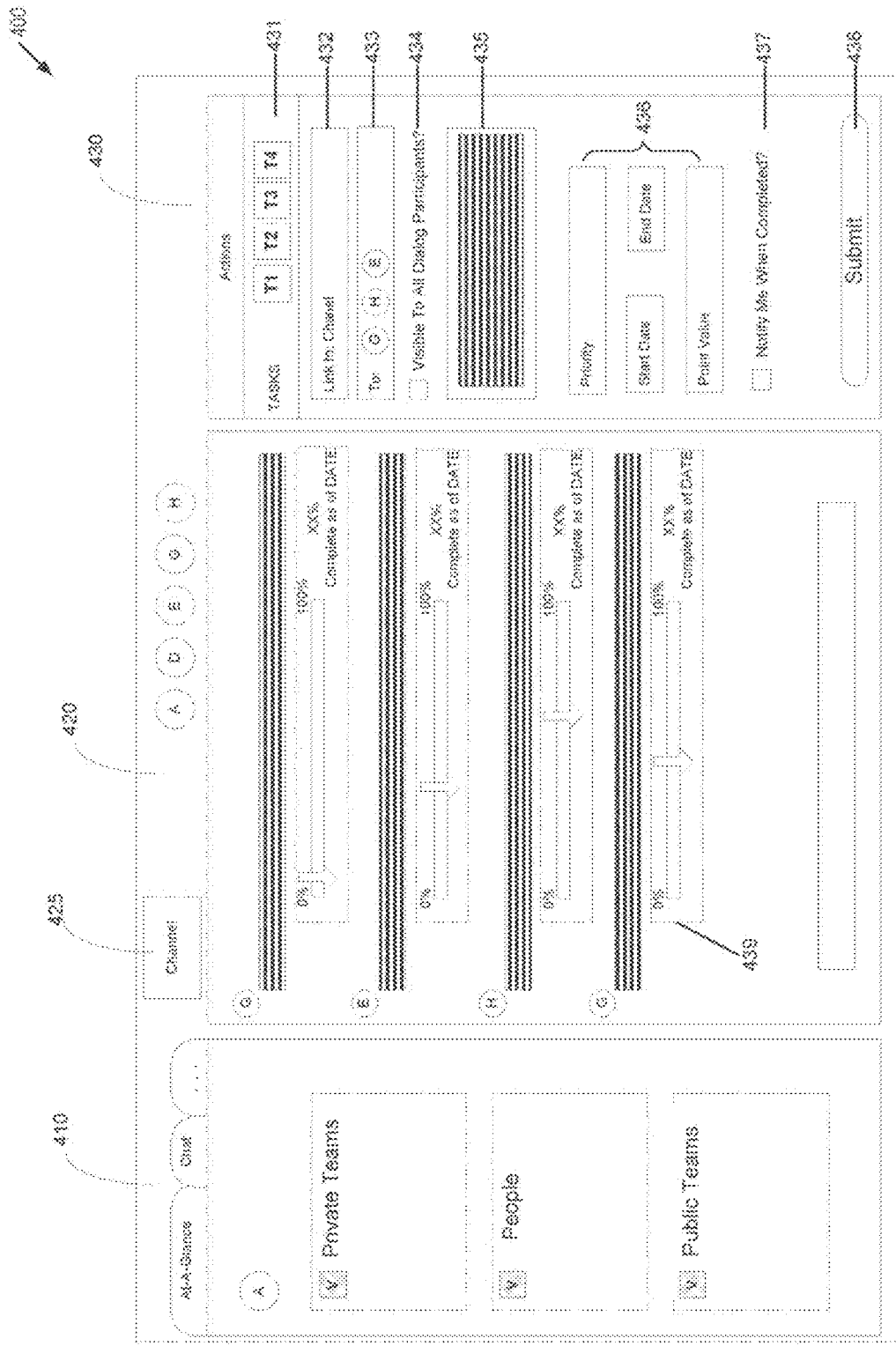

In FIG. 4D, another view of the interactive interface portal 400 is shown. In this example, if the user selects the tasks actionable object, the interface 400 may adjust the side panel 430 to provide characteristics relating to a specific type of tasks for participants of the chat session. For example, the participants may be part of a work group and the sending participant seeks information to manage the process of the work group. When the sending participant initiates this actionable object, several fields are displayed in the side panel 430 in which the sending participant can characterize certain aspects of the tasks actionable object.

As shown in FIG. 4D merely as an illustrative example, these fields may include a plurality of control objects 431 to select a particular task for the chat session, a channel field 432 to identify a channel identifier selected by the sending participant, a recipient field 433 to add particular recipients, a visibility field 434 to indicate whether the assigned task are made visible to other participants, a message field 435, task entry fields 436 to enter relevant information regarding the assigned task, a notification field 437 to indicate that the sending participant is to be notified when the task is completed as well as other relevant fields regarding the process of the work group. In some implementation, some participants may be able to setup preferences regarding tasks received. These other relevant fields may include, but not limited to, estimated time to complete a task, requisite qualifications, minimum compensation for accepting, etc.

Once the task entry fields 436 are completed, the sending participants may preview the task before submitting the tasks actionable object 431 to the chat session. The tasks actionable object is then embedded in the chat message as a "structured" data object that can be executed by the client device of a receiving participant. In some implementations, the tasks actionable object 431 can be associated or assigned to one or more receiving participants. For example, information regarding the receiving participants may be inserted into recipient field 433. In one implementation, the sending participant may send the tasks actionable object 431 to receiving participant in the chat session by activating a control 438 on the interface portal 400. In some implementations, the receiving participants may configure certain preferences regarding receiving task actionable objects, such as a type of task the participant is willing to accept, a minimum compensation for accepting the task, etc.

In some implementations, the receiving participants can include members and non-members of the chat session, or another team or participant in the chat system that is not in the chat session. In one implementation, non-members may be notified by through an electronic transmission, such as email that a task is waiting. A link may be provided in the email notification directing the non-member to move into a browser to view the task. In addition to being notified that a task is waiting, the non-member may be provided with other information regarding the task, such the identity of the sending participant.

In some implementations, a control object 439 (e.g., a slider display object) to control an input of response information is inserted into the chat session related to the actionable object executed on the client device of the participants. If an individual task is assigned to more than one participant than multiple control objects, such as slider object 439, may be displayed indicating the progress (% completed) of that corresponding participant. The control objects are adjustable only by the intended participant. In some implementations, the "Task" percent complete along with the date that the slider is last updated is shown in the control object. For example, a task 50% complete on a date that was 4 days prior to the current date may indicate something different than a note from the participant indicating that the task was 50% complete as of the current date. In some implementations, slider object 439 may appear in a certain color and can be adjusted by the receiving participant in accordance with a process status of the task, such as Green, Yellow and Red.

C. Idea Objects

Figure 4E:
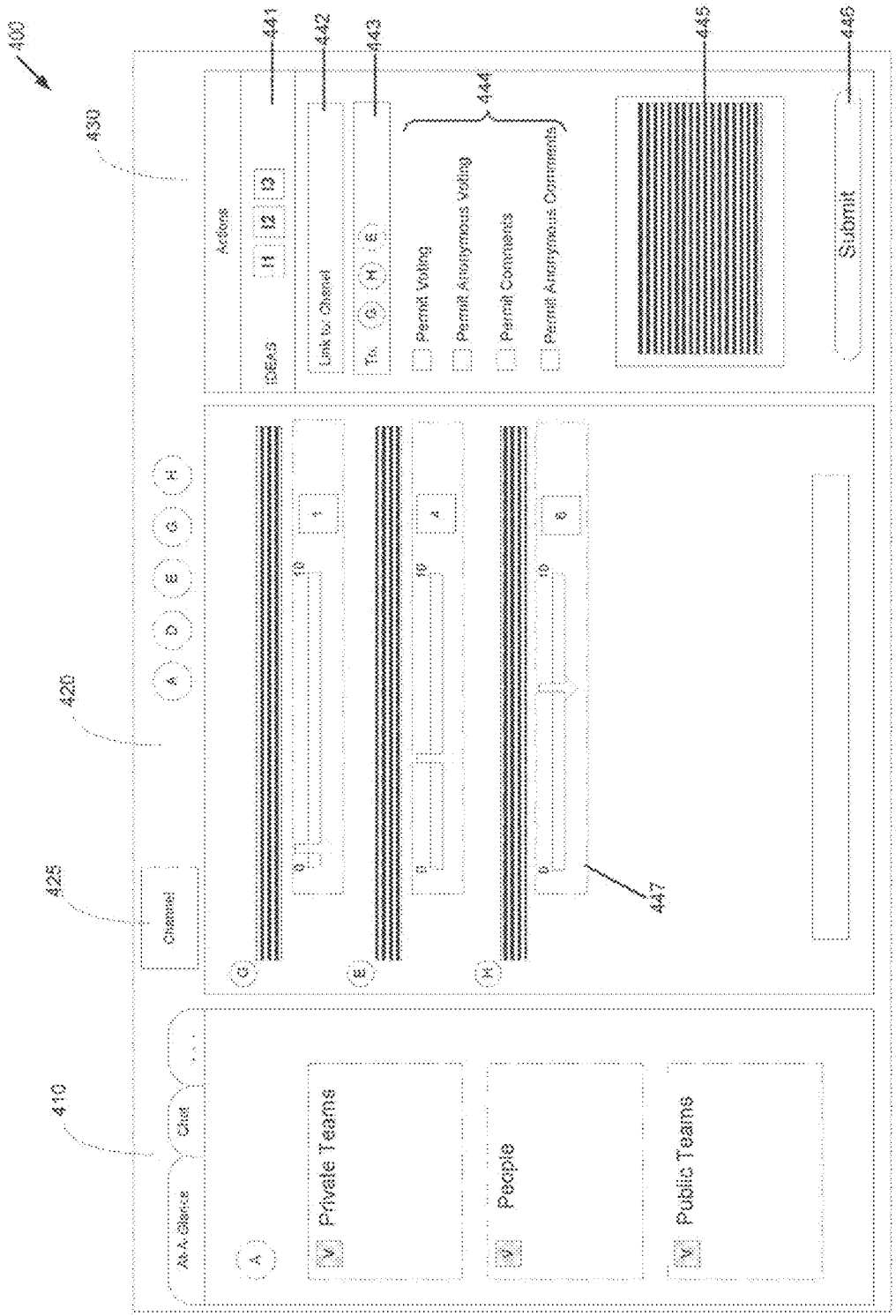

With regards to FIG. 4E, another view of the interactive interface portal 400 is shown. In this example, if the user selects the idea actionable object, the interface 400 may adjust the side panel 430 to provide characteristics relating to a specific type of input for an idea actionable object to include in the chat session. For example, the participants may be part of a work group and the sending participant wants to propose an idea to the work group. When the sending participant initiates this actionable object, several fields are displayed in the side panel 430 in which the sending participant can characterize certain aspects of the idea actionable object.

As shown in FIG. 4E, merely as an illustrative example, these fields may include a plurality of control objects 441 to select a particular idea type for the chat session, a channel field 442 to identify a channel identifier selected by the sending participant, a recipient field 443 to add particular recipients, idea entry fields 444 to provide for certain responses to the idea, a message field 445 to provide idea details as well as other possible fields. The idea actionable object can be embedded in the chat message as a "structured" data object that can be executed by the client device of a receiving participant. In some implementations, the idea actionable object 441 can be associated or assigned to one or more receiving participants. For example, information regarding the receiving participants may be inserted into recipient field 443. In one implementation, the sending participant may send the idea actionable object 441 to receiving participant in the chat session by activating a control 446 on the interface portal 400.

In some implementations, the receiving participants can include members and non-members of the chat session, or another team or participant in the chat system that is not in the chat session. In one implementation, non-members may be notified by through an electronic transmission, such as email that a task is waiting. A link may be provided in the email notification directing the non-member to move into a browser to view the task. In addition to being notified that a task is waiting, the non-member may be provided with other information regarding the task, such the identity of the sending participant.

In some implementations, a control object 447 (e.g., a slider display object) to control an input of response information into the chat session related to the actionable object executed on the client device of the participants. If an individual idea is assigned to more than one participant then multiple control objects, such as slider object 439, may be displayed. The control objects are adjustable only by the intended participant. In some implementations, the slider can be updated to provide a uniform numerical response for the participant rather that unstructured data. In some implementations, the interface portal 500 may provide an indicator (e.g., a display icon) of a total number of respondents to the idea as well as an average score of all responses received based on the control objects 447 associated with each receiving participant.

IV. Other Example Interactive Interfaces

FIGS. 5A-5D are examples illustrating an interactive interface portal 500. For example, the interface portal 500 may correspond to interface portal 118 in system 100 of FIG. 1. Interface portal 500 may be compared to interface portal 300 of FIG. 3 and interface portal 400 of FIG. 4. For example, the interface portal 500 includes several panels that include a channel/dialog panel 510 (which may be compared to channel/dialog panel 310 and channel/dialog panel 410, a message window panel 520 (which may be compared to message window panel 320 and message window panel 420) and a side panel 530 (which may be compared to side panel 330 and side panel 430). The interface portal 500 provides an example interface in which a chat messaging session can be engaged by a number of participants that are represented by the participant icons A-H on the portal 500. In this example, the interface portal 500 allows participants to integrate user perceivable actionable objects in a chat session channel 525, which can be executed by a client device to enhance communications between participants of the session channel 525.

A. Sidebar Selection

In some implementations, the system provides asymmetrical chat through chat channels that are generally visible to all or directed participants in an intended group. An advantage of this is that users can reply 1 to 1 to someone in a group chat rather than the typical limited and distracting Reply-To-All messaging technology. For example, a user can reply directly to someone in a group chat that can be kept private from other group members without having to engage the entire group, while retaining context and relativity to the broader conversation for the participants of the 1 to 1 conversation.

Figure 5A:
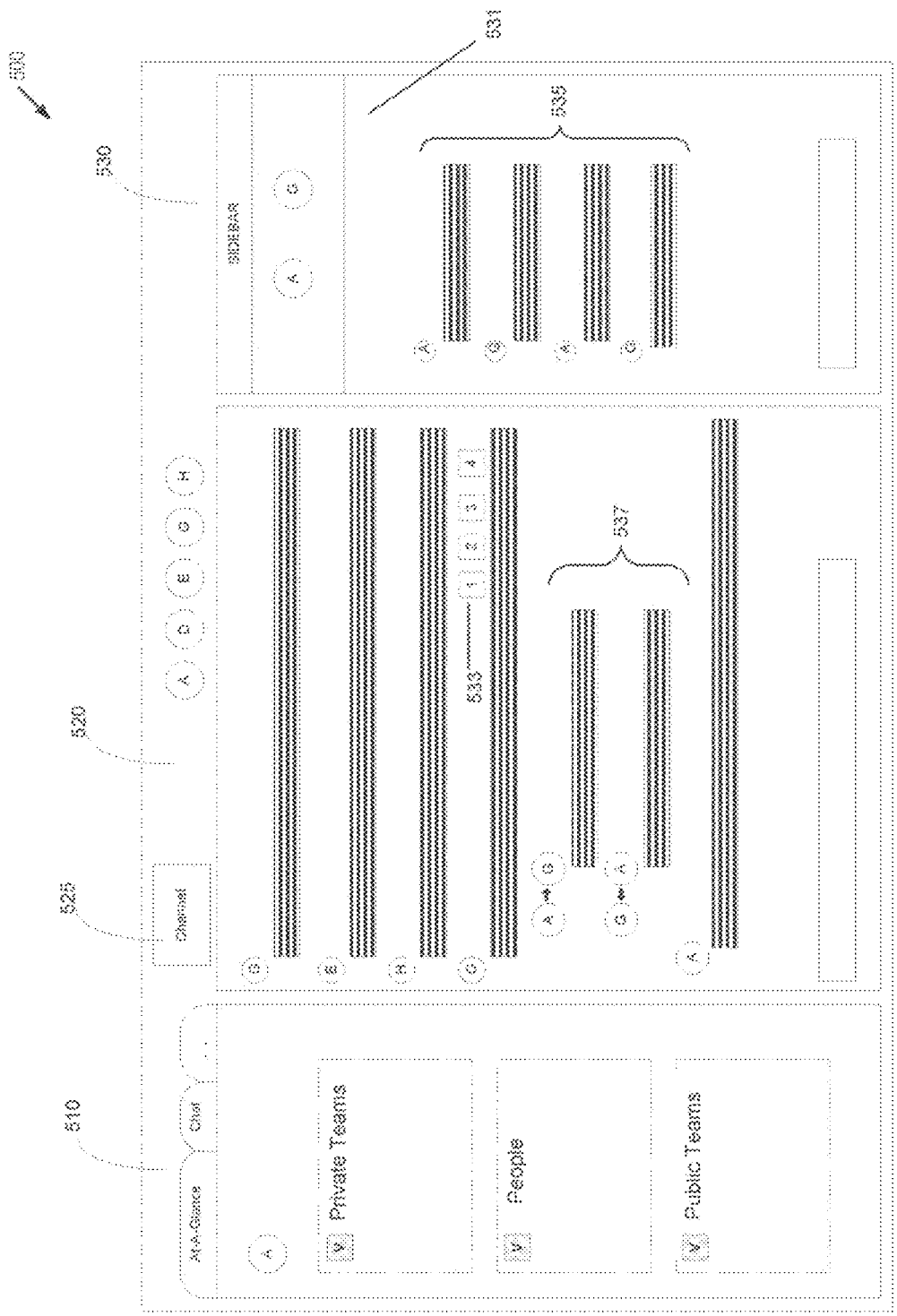
FIGS. 5A-5D are examples illustrating another interactive interface portal in accordance with aspects of the disclosure.

Turning to FIG. 5A, another view of the interactive interface portal 500 is shown. In this example, interactive interface portal 500 includes the capability of opening a sidebar selection 531 that allows two or more members, such as member A and G of a larger group session channel 525 to communicate privately in a private chat session 535. In some implementations, the private chat session 535 is hidden from display to the other participants of the larger group session. In one implementation, the interface portal 500 may include controls 533 to integrate some or all of the private chat session 537 into the larger group session channel 525 for display to other participants. In some implementations, the private chat session 535 in response to a request from the first participant or the second participant may permit a third participant to join the second chat session that is either currently in or not in the larger group session channel 525.

In some implementation, a first chat participant, such as participant A, clicks on and/or hovers over the display name for a second chat participant, such as participant G, in the main window 520, a sidebar session 531 opens. In some implementations, the first chat participant may also initiate the sidebar session 531 by activating a control 533 associated with a message from the second chat participant. The sidebar session 531 allows the first chat participant to interact directly with the second chat participant outside of larger group session channel 525 that includes the other participants. The sidebar session 531 includes functions available to users of interface portal 500. For example, sidebar session 531 allows the first and second chat participants to integrate actionable objects, such as actionable objects 119, into the private chat session 535 to enhance the electronic communications between the participants.

Figure 5B:
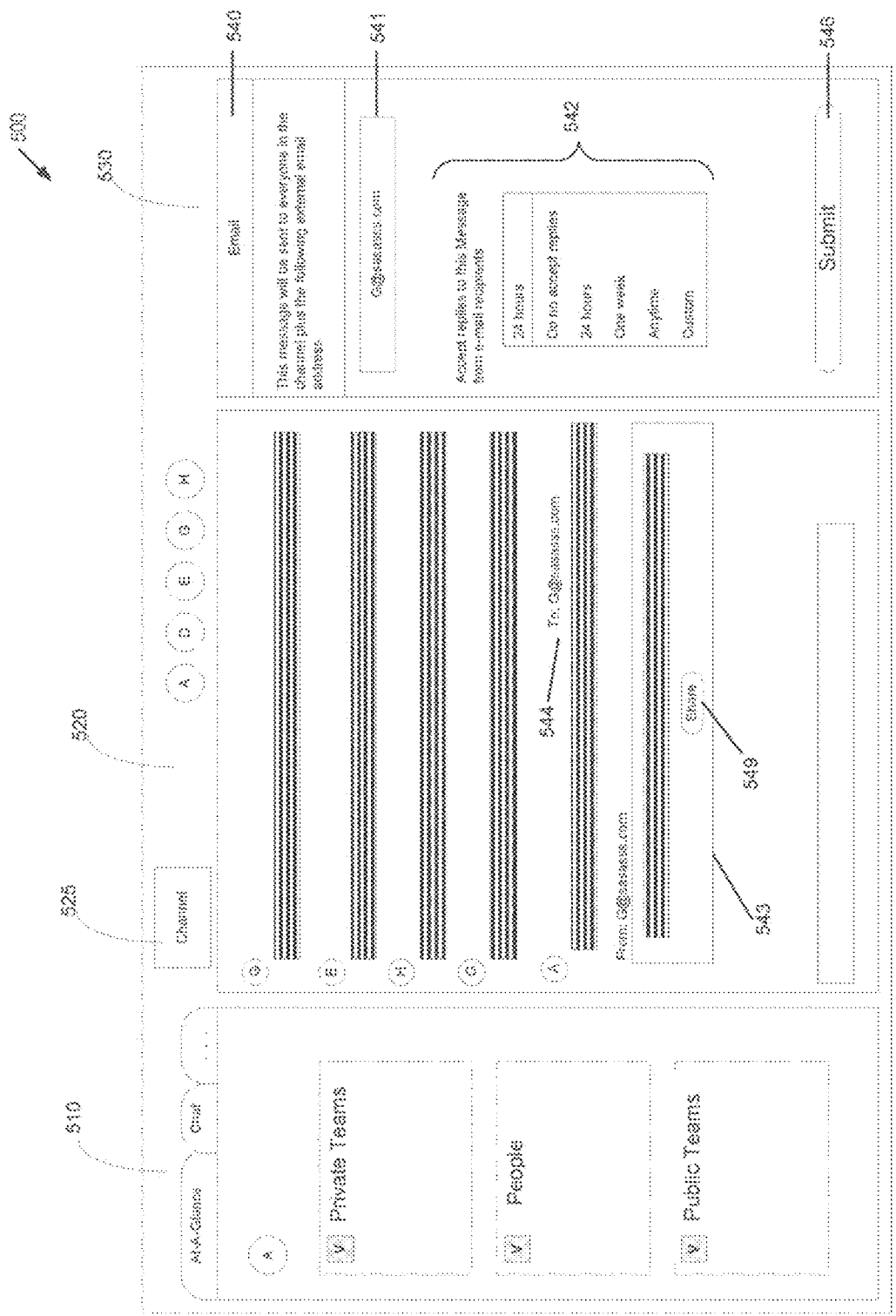
Figure 5C:
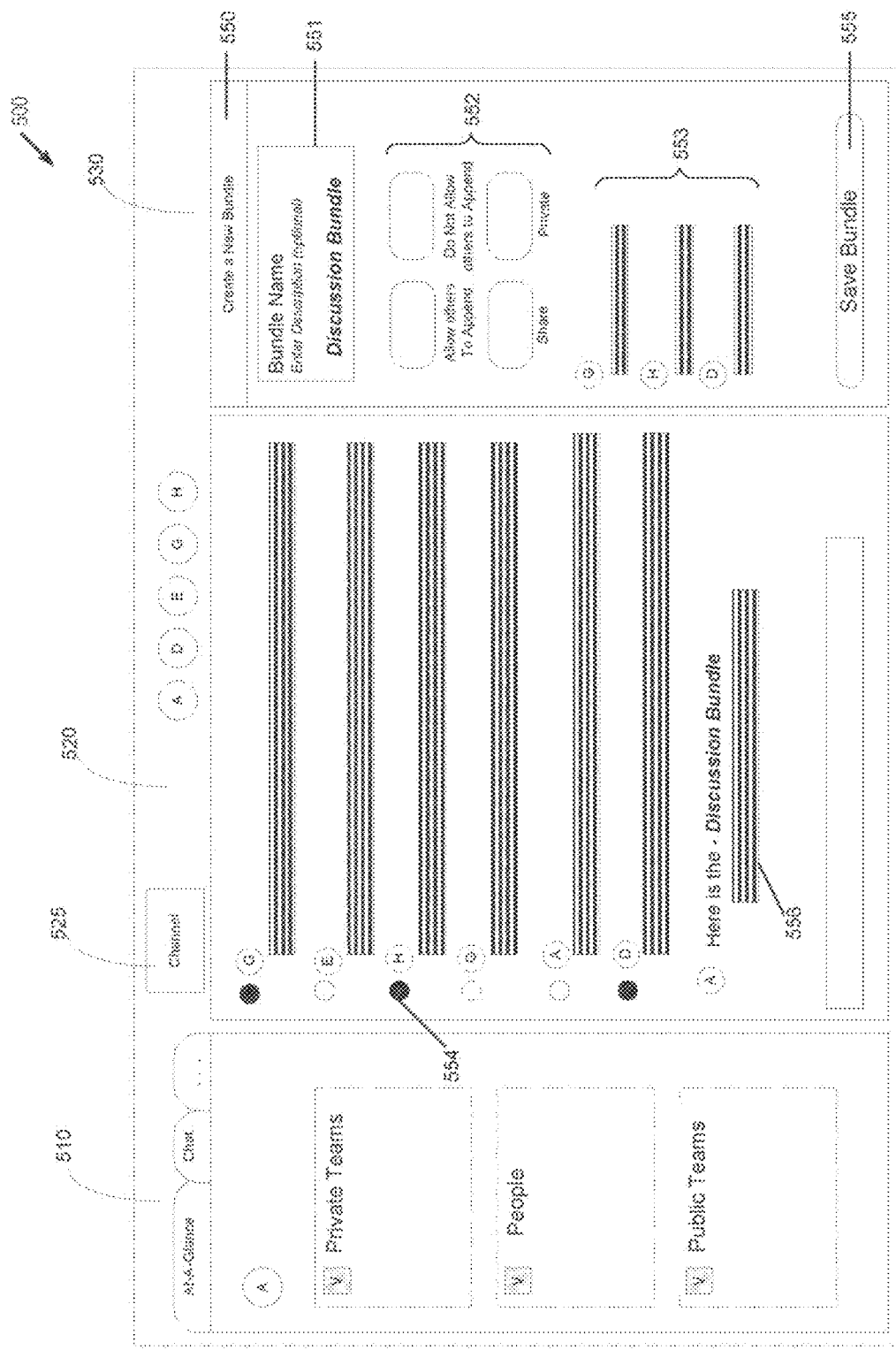
Figure 5D:
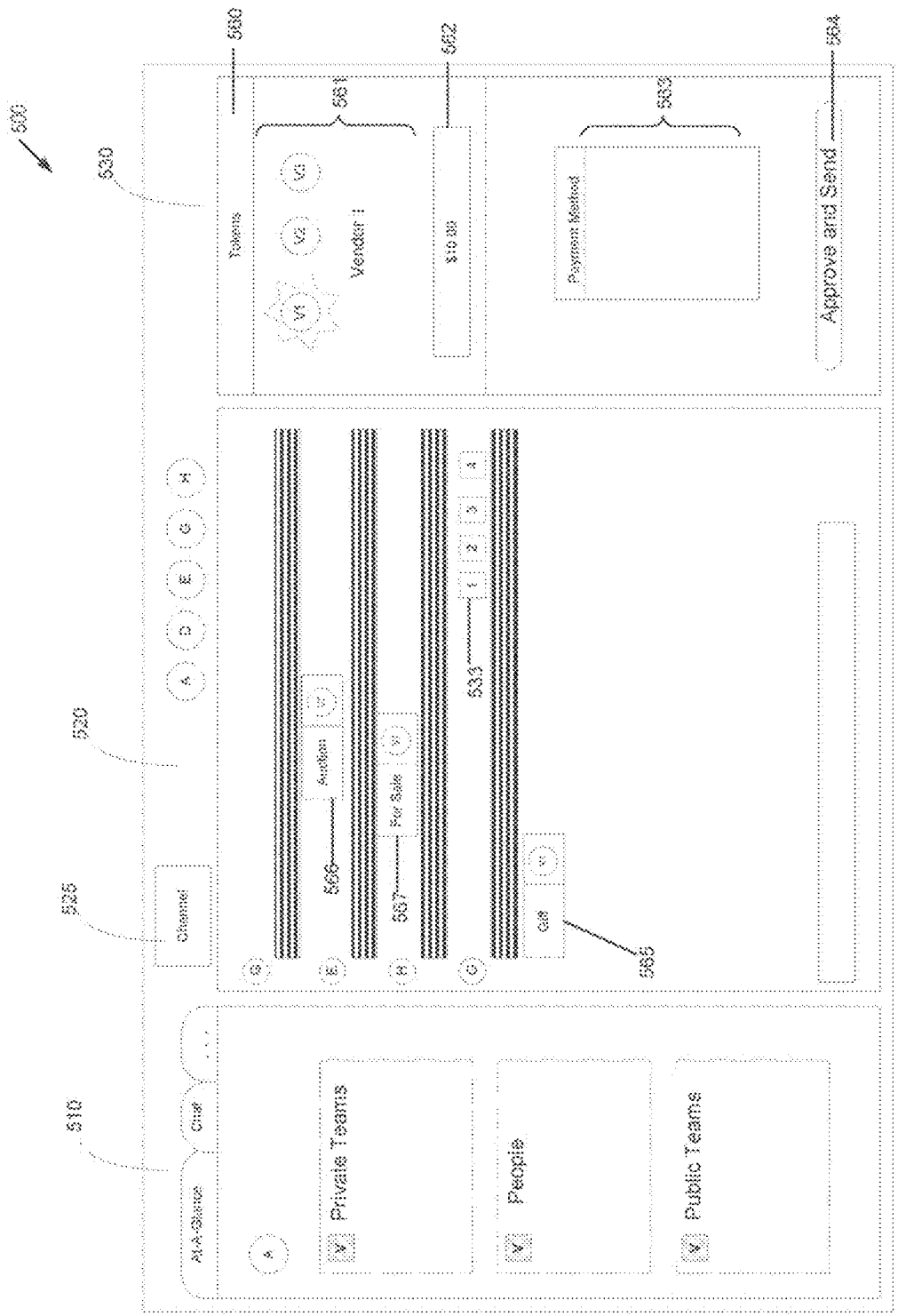
Figure 5E:
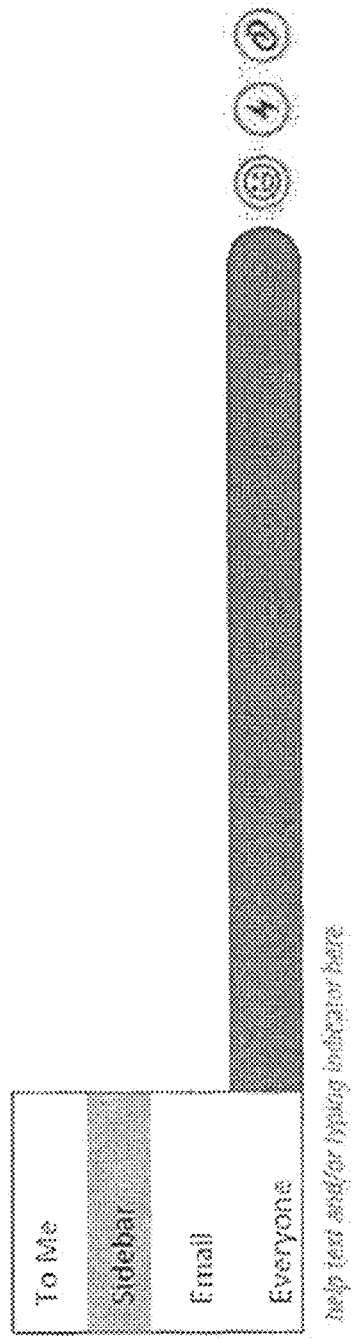
FIG. 5E illustrates an exemplary text entry bar that allows for sidebar selection.

FIG. 5E is an exemplary screen shot that illustrates one exemplary approach that allows users to initiate a Sidebar. A Sidebar may be a 1:1 private conversation between two (for example) members (or more) of a larger group conversation from within a group channel. Messages in the Sidebar are only visible to the parties to the Sidebar. This is further described below with reference to FIGS. 10A-10I.

B. Targeted Inclusion with Response Rules

In some implementations, the system of the present disclosure allows users to send and receive emails from a group chat channel. For example, a user may send a message to the e-mail address of someone outside of the system. When a response to the email comes back, the originator of the message can choose to share the entire incoming email or subset thereof with the group or directed participants of the group. To avoid unwanted, unsolicited messages and spam back into a chat channel, the system ascribes a unique identifier to each email sent and in combination with rules for the unique identifier. This permits the sender of an email from the system to define and associate response rules to outgoing messages for replying emails. These rules may be applied to accept or reject to the incoming emails and may include, but not limited to, only accepting a defined number of responses or only accepting responses that are received within a defined period of time (or any combination thereof), accepting a certain number of response (e.g., up to three responses even after the time period expires), accepting emails from associated accounts (e.g., an email may be sent to a user's work email but responses can still be accepted from another (personal) email account associated with the user in accordance with the rules) as well as other types of rules. By including the email message into the chat message stream at the time and place an email originated from and is received, the emails are placed into the discussion in context. Thus, the channel message stream retains meaning and immediate lasting context that is not available in typical chat technology.

In FIG. 5B, another view of the interactive interface portal 500 is shown. In this example, interactive interface portal 500 includes the capability of linking an e-mail session panel 540 to a chat session associated with the plurality of participants. In this regard, the email session may include an actionable object that can be integrated into the chat session. The email session panel 540 may include a plurality of fields to provide information regarding one or more email addresses in which data may be received and integrated into the chat session. The plurality of fields may include, but is not limited to, an email address field 541 to enter one or more email addresses and a time period field 542 that indicates the chat message session is active to receive data, via a network connection, from the email session during a predetermined time period. For example, the time period field 542 may include a drop down menu of time periods that can be associated with the e-mail session.

After entering the relevant information into the email session panel 540, the sending participant may integrate the email session into chat session by activating a control 546 on the interface portal 500. In this regard, an indicator 544 of the email session that is incorporated in the chat session may be displayed on the main window 520 of the interface portal 500. During the determined time period, data may be received from the email session to be incorporated into the chat session. For example, the data may be displayed in the main window 520 of the interface portal 500 as chat messages. If it is detected that the time period has expired, an alert may be provided by the system to the e-mail session to indicate that data received from the email session is rejected for inclusion in the chat message session.

As shown in FIG. 5B, data 543 received from the email address associated with the email session may be then incorporated into the chat session. In some implementations, this data 543 may include an actionable object, such as actionable object 119, comprising a type indicator to characterize a user perceivable action to be executed in the chat message session. In some implementations, the data 543 may include a control 549 that can be activated to incorporate all or a portion of the data received from the email session into the chat session. In one implementation, the actionable object received from the email session may be combined with a second actionable object in the chat session to adjust characteristics of the user perceivable action to be executed as discussed above. In some implementations, action object can be sent to the email session. In such cases, the email session may receive a link that would direct the user back to the system to complete the action associated with the action object. For example, if the action is a polling question object, the response for the e-mail session may be incorporated into the overall results associated with the object in the chat session. In other cases, if the task object is sent to the email session, the recipient may update a status of the task to indicate their completion status. This update is then recorded and reflected in the action object related to the chat session.

C. Bundle Communications

With bundle communications, the system of the present disclosure allows users to parse through a previous channel discussion and assemble those messages and actions that the user desires to be saved for future reference. These Bundles can be appended to messages in the chat channel, for example by the creator or others participants if so constructed. In one example, the bundle communications can include a bundle message associated with a particular topic, such as a bundle of best practices or a bundle consisting of an important team discussion or decisions.

In FIG. 5C, another view of the interactive interface portal 500 is shown. In this example, interactive interface portal 500 includes the capability of selecting particular messages from a chat session to include in a discussion bundle 550. The discussion bundle 550 may include plurality fields that include, but not limited to, a name field 551, one or more display/update option fields 552 that may indicate whether the discussion bundle 550 can be shared, is private or updatable by other participants, and an indicator of the messages 553 included in the bundle. For example, a participant may select an icon, such as indicator 554, at each of the messages to be included in the discussion bundle 550. After identifying the message to be included discussion bundle 550, the sending participant may integrate discussion bundle 550 into chat session by activating a control 555 on the interface portal 500. In this regard, an indicator 556 of the messages incorporated in the chat session may be displayed on the main window 520 of the interface portal 500.

D. Token Items

With regards to FIG. 5D, an example of the interactive interface portal 500 is shown. In this example, the interface portal 500 includes the capability of transmitting token items 560 of a certain value to participants or groups of participants through a chat session. Each token item is associated with a vendor from a list of vendors 561 that provides a particular service or product. In some implementations, a participant may select a token item 560 to transmit to another participant in the chat session. An indicator (such as icon indicators 565, 566 and 567) of the token item 560 may be inserted into the main window 520 of the interface portal. The token item 560 may include, but not limited to, an intended recipient, a value field 562 associated with the token, and a payment method field 563 (e.g., banking or credit card information).

In some implementations, a participant may enter or select a value in the value field 562 to be associated with the token item 560. The sending participant may integrate the token item into chat session by activating a control 564 on the interface portal 500. When the sending participant activates the control 564, a transaction is registered with the system regarding the token item 560. A confirmation screen may appear along with legal disclaimer information, terms and conditions and/or requesting that the form of payment. If a form of payment is previously entered and saved in the payment method field 563 then the participant may be asked to confirm the saved information. Alternatively, if a credit balance exists in the sending participant's account may be debited. In one implementation, a bank account associated with the sending participant may be established and funded by credit, cash or otherwise. If the account is pre-funded with an amount, for example $50, then subsequent selected token item 560 and their corresponding costs would be debited from the account balance.

Each token item 560 is assigned a transaction identifier and encoded with a unique identifier and authentication code to ensure the token's authenticity. In some implementations, techniques of disclosure for providing the token items 560 can be directly integrated into the point-of-purchase payment system utilized by any specific vendor. In one implementation, the token items 560 can be linked to a physical card (e.g., gift card) associated with the vendor. In other implementations, an exchange system may be employed so that if a user wants to (for example) exchange their token items 560 for another type of token item. In this regard, the exchange may include determining an exchange rate to convert a value of one token item to an equivalent value of the other token, such as converting dollars to their equivalent miles.

In some implementations, a participant may select a token item from the vendor list 561. In one implementation, the participant may send a token as a reaction to a chat message by selecting the chat message in the main window 520 and selecting a control icon 533 associated with gifting the token items 560. In this example the participant selects to gift the token item to a recipient as represented by the gift token icon 565 in the chat session. In some implementations, the receiving participant may identify certain selections to indicate their preferred gift choices. In this manner, the sending participant of a gift is able to identify the gift preferences of the intended recipient. In one implementation, the sending participant may override the receiving participant preferred gifts and select a different gift to provide to the recipient. Some gifts may have monetary value while others may be associated with, for example, a points system of the specific vendor. In some implementations, the gift token icon 565 may display a group of gifts to select from that are provided by the sending participant.

In some implementations, the recipient of the token does not have to be member of the chat session. For example, the recipients may be selected by a charity or other entities engaged in fundraising. In this example, the sending participant may conduct a funding campaign to solicit donations from receiving participants, who may be members or non-members, in the chat session. The receiving participants may receive the token item and choose to contribute an amount towards to recipient. The total amount raised and/or goal may be indicated in the token item as displayed on the interface portal 500.

In some implementations, the token items 560 may represent items up for auction as indicated by the auction token icon 566. In this example, a product or item may be shown along with a current bid amount. Users can bid on items being offered. In this regard, certain rules can be established to represent what constitutes a winning bid and how many winners there can be amongst the participants. User can click on the auction token icon 566 to view more details, conditions, reviews, etc., regarding the auction. Bidding for an item may end based on the rules as well as the rules defined by the sending participant and related to the item being offered. Users and/or authorized 3rd party vendors or companies can post items to be auctioned.

In some implementations, the token items 560 may represent items up for sale as indicated by the sale token icon 567. In some implementations, users may select a group sale or flash sale associated with the sale token icon 567 or direct the sale of the item to a particular participant in the chat session. Receiving participants may hover over, select, click or otherwise activate the sale token icon 567 to indicate an interest in a specific message. The user may be able to view additional information about the item being offered for sale by hovering or clicking (selecting) the sale token icon 567. When the user activates the sale token icon 567, several choices may be displayed for the user to indicate an interest and how the pay for the item. For example, the payment options may include, but not limited to, "buy now", "buy", "finance", etc. In an alternative implementation, the payment options may be pre-configured and associated with a credit card, debit card, ACH or another type of payment account.

V. Example Flow Diagrams

To better aid in understanding implementations of some of the aspects described above that are, for example, related to integrating actionable objects into an on-line chat communications platform, reference is now made to the following flow diagrams. It should be noted that the following operations do not have to be performed in the precise order described below. Rather, various operations can be handled in a different order or simultaneously, and operations may be added or omitted.

Figure 6:
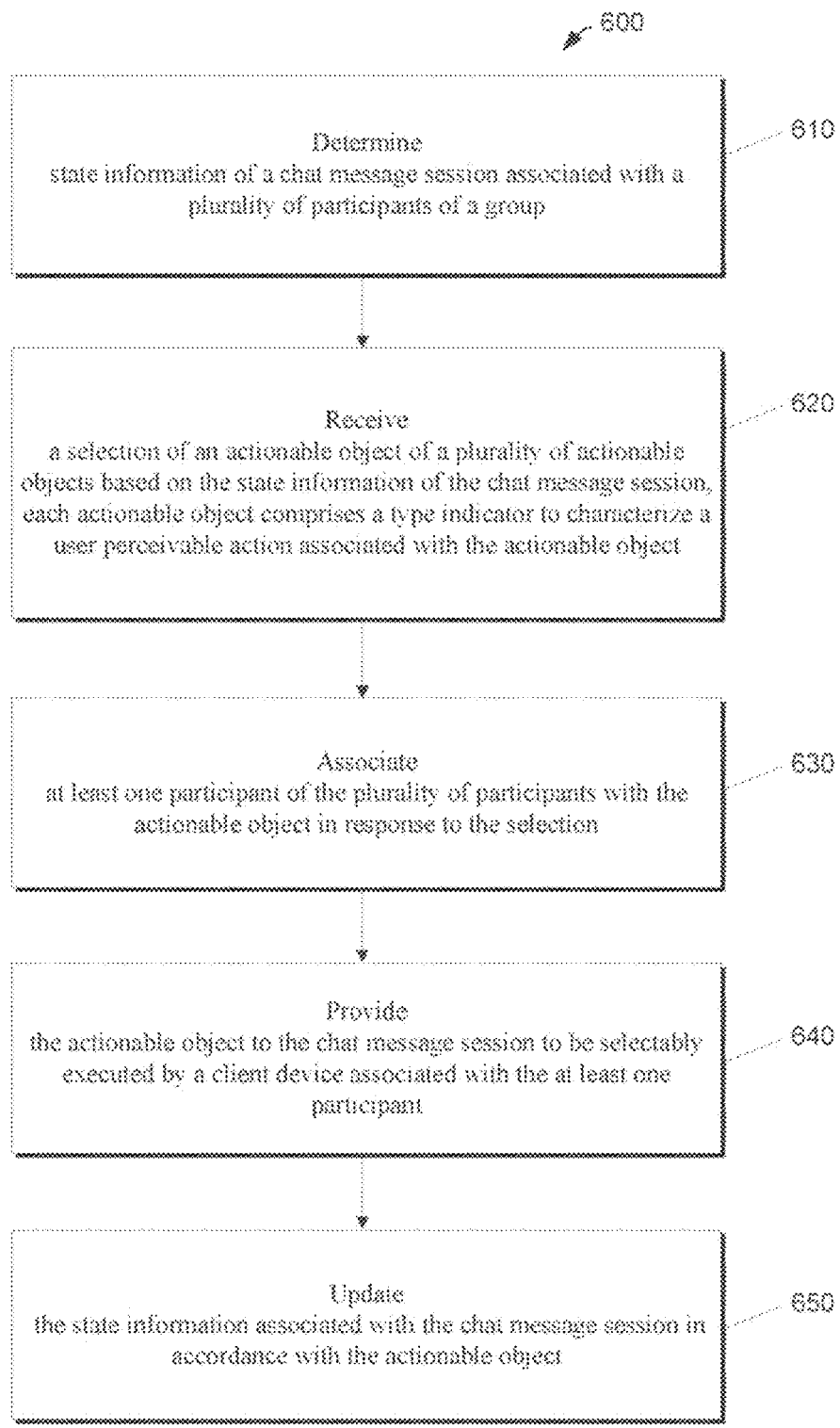
FIG. 6 is an example of a flow diagram illustrating an implementation of a method in accordance with implementations of the disclosure.

FIG. 6 depicts a flow diagram of a method 600 in accordance with one or more aspects of the disclosure. In one implementation, the processing device 112 of FIG. 0.1 may perform method 600. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of a shared storage system. It should be noted that blocks depicted in FIG. 6 can be performed simultaneously or in a different order than that depicted.

Method 600 begins at block 610 where state information of a chat message session associated with a plurality of participants of a group is determined. In block 620, an actionable object of a plurality of actionable objects is selected based on the state information of the chat message session. Each actionable object comprises a type indicator to characterize a user perceivable action associated with the actionable object. In this regard, the type indicator comprises at least one of: a question indicator, a task indicator or an idea indicator associated with the group. At least one participant of the plurality of participants is associated with the actionable object in block 630. Thereupon, the actionable object is provided to the chat message session to be selectably executed by a client device associated with the at least one participant in block 640. In block 650, the state information associated with the chat message session is updated in accordance with the actionable object.

Figure 7:
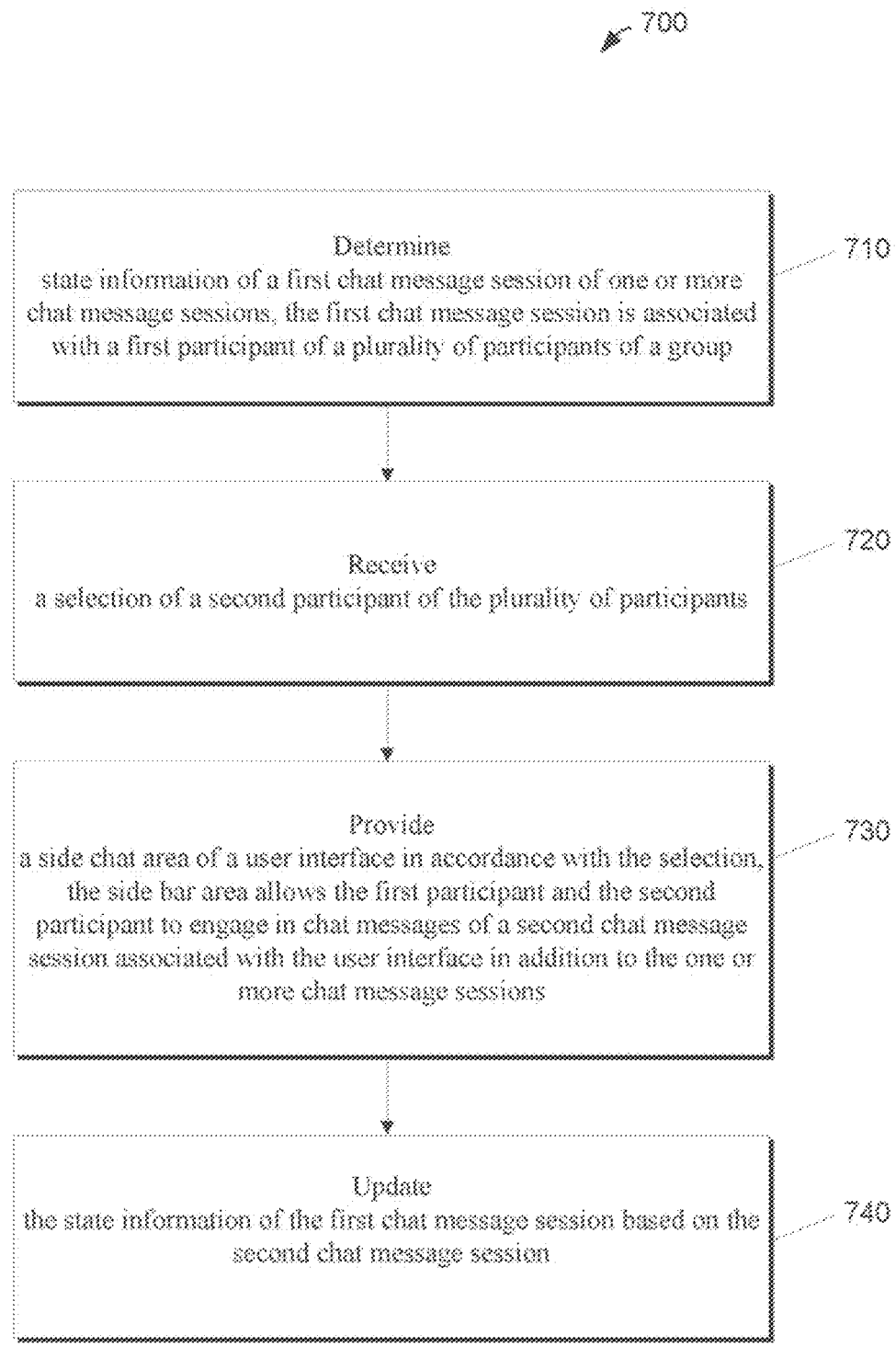
FIG. 7 is an example of a flow diagram illustrating an implementation of a method in accordance with implementations of the disclosure.

FIG. 7 depicts a flow diagram of a method 700 in accordance with one or more aspects of the disclosure. In one implementation, the processing device 112 of FIG. 0.1 may perform method 700. The method 700 may be performed by processing logic that may comprise hardware (circuitry, dedicated logic, etc.), software (e.g., software executed by a general purpose computer system or a dedicated machine), or a combination of both. In alternative implementations, some or all of the method 700 may be performed by other components of a shared storage system. It should be noted that blocks depicted in FIG. 7 can be performed simultaneously or in a different order than that depicted.

Method 700 begins at block 710 where state information of a first chat message session of one or more chat message sessions. The first chat message session is associated with a first participant for a plurality of participants of a group is determined. In block 720, a selection of a second participant of the plurality of participants is received. A side chat area of a user interface is provided in block 730 in accordance with the selection. The side bar area allows the first participant and the second participant to engage in chat messages of a second chat message session associated with the user interface in addition to the one or more chat message sessions. In this regard, the second chat message session is hidden from display to other participants of the first chat message session. In block 740, the state information of the first chat message session is updated based on the second chat message session.

Figure 8:
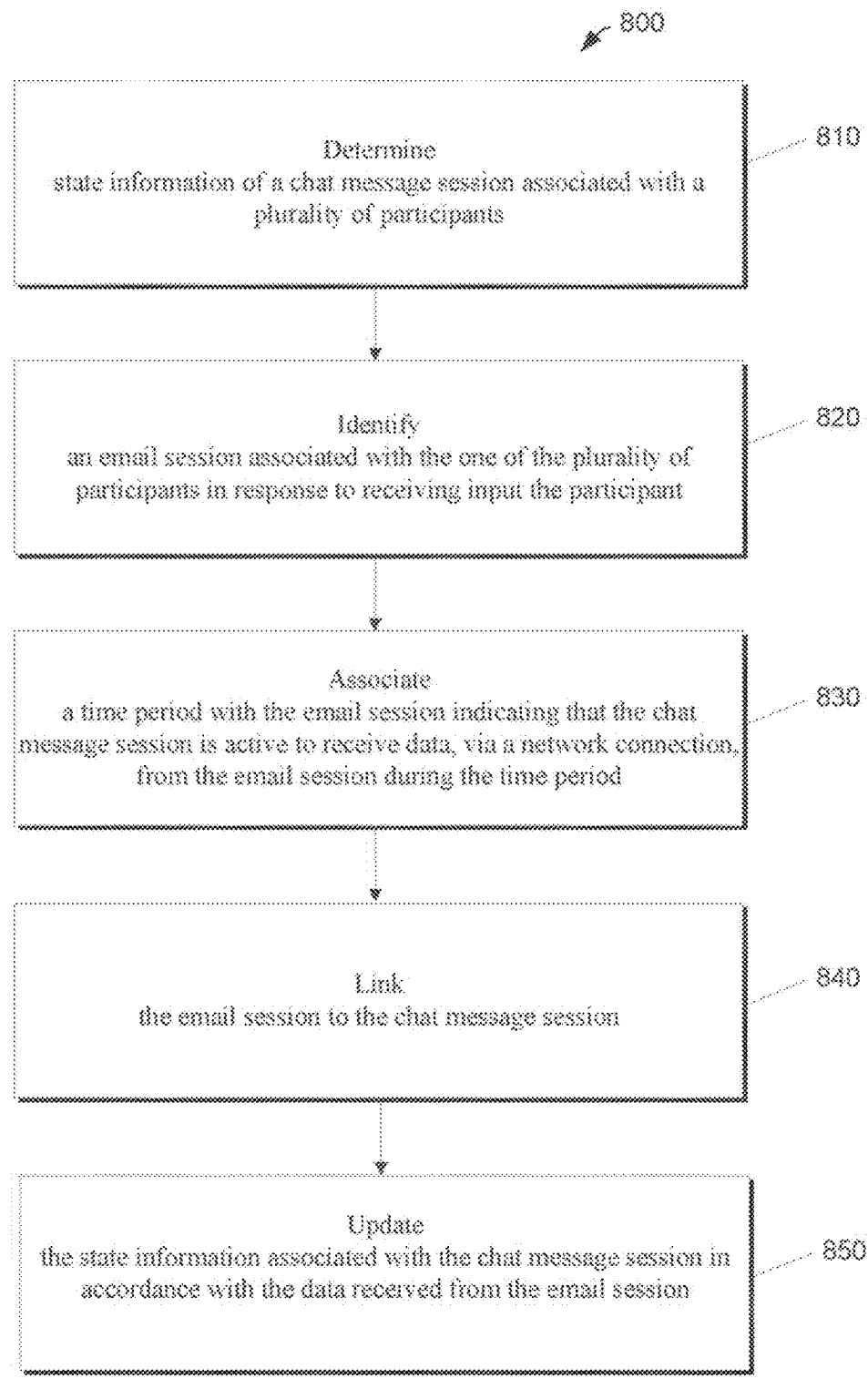
FIG. 8 is an example of a flow diagram illustrating an implementation of a method in accordance with implementations of the disclosure.

FIG. 8 depicts a flow diagram of a method 800 in accordance with one or more aspects of the disclosure. In one implementation, the processing device 112 of FIG. 0.1 may perform method 800. The method 800 may be performed by processing logic that may comprise hardware (circuitry, dedicated logic, etc.), software (e.g., software executed by a general purpose computer system or a dedicated machine), or a combination of both. In alternative implementations, some or all of the method 800 may be performed by other components of a shared storage system. It should be noted that blocks depicted in FIG. 8 can be performed simultaneously or in a different order than that depicted.

Method 800 begins at block 810 where state information of a chat message session associated with a plurality of participants is determined. In block 820, an email session associated with the one of the plurality of participants is identified in response to receiving input the participant. A time period is associated in block 830 with the email session indicating that the chat message session is active to receive data, via a network connection, from the email session during the time period. In block 840, the email session is link to the chat message session. In block 850, the state information associated with the chat message session is updated in accordance with the data received from the email session.

VI. Example Machine

Figure 9:
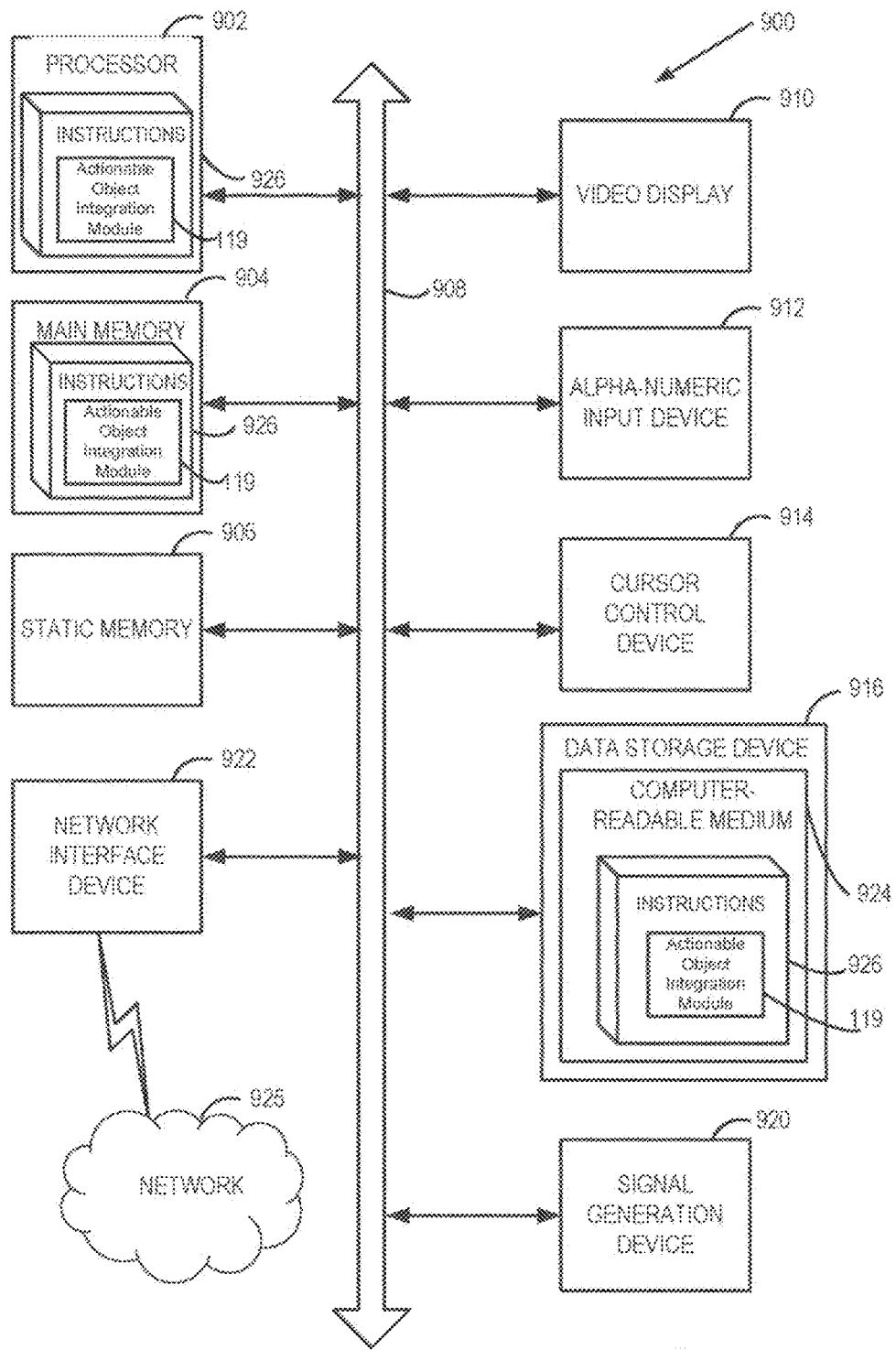
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 may be comprised of a processing device 902 (which may correspond to a processing device 112 within system 100 of FIG. 1), a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 916, which communicate with each other via a bus 908.

In a further aspect, the computer system 900 may include a processing device 902 (which may correspond to processing device 112), a volatile memory 904 (e.g., random access memory (RAM)), a non-volatile memory 906 (e.g., read-only memory (ROM) or electrically-erasable programmable ROM (EEPROM)), and a data storage domain 916, which may communicate with each other via a bus 908.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute processing logic 926 for performing the operations and steps discussed herein.

Computer system 900 may further include a network interface device 922. Computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

Data storage device 916 may include a machine-readable storage medium (or more specifically a computer-readable storage medium) 924 having one or more sets of instructions embodying any one or more of the methodologies of functions described herein, including instructions encoding the techniques including the actionable object integration module 119 of FIG. 1 for implementing method 600 of FIG. 6 and method 700 of FIG. 7 and method 800 of FIG. 8 for integrating actionable objects into an on-line chat communications platform. In some implementations, the actionable object integration module 119 may also reside, completely or at least partially, within main memory 904 and/or within processing device 902 during execution thereof by computer system 900; main memory 904 and processing device 902 also constituting machine-readable storage media. The actionable object integration module 119 may further be transmitted or received over a network 925 via network interface device 922.

Instructions 926 may also reside, completely or partially, within volatile memory 904 and/or within processing device 902 during execution thereof by computer system 900, hence, volatile memory 904 and processing device 902 may also constitute machine-readable storage media.

Sidebars and Asymmetrical Group Messaging Views

This explanation is further to the explanation above with regard to "SIDEBAR SELECTION" and FIG. 5A.

At present, group chat applications present all messages to all group participants. In fact, this is a basic premise of what group chat is. Inherent in this approach to group chat (channels, rooms, etc) is that unnecessary and meaningless messages are presented to all group participants (Symmetrical—everyone sees everything i.e. all messages). It would be desirable to participate in a group discussion without being subjected to or forced to read meaningless messages—and more to the point, it would be desirable for individual members to communicate privately with another member (or subset of members) from within a group channel. In order to retain situational context, the private messages are desirably viewed embedded within the general channel message stream but also to avoid possible confusion or lack of continuity, the related private messages are desirably also able to be viewed together without the noise of interspersed general channel messages. Presented here is a possible solution and attempt to achieve the aforementioned objectives. It reduces the channel clutter imposed by comments such as "Thanks" intended for one but forced upon all, and provides a mechanism to allow for private sidebar conversations among a subset of a group or channel—while retaining the situational context of the private comments within and related to the overall general conversation. In an exemplary embodiment of the present invention, only the parties to a sidebar conversation see the messages related to the sidebar conversation (unless other action is taken).

Figure 10A:
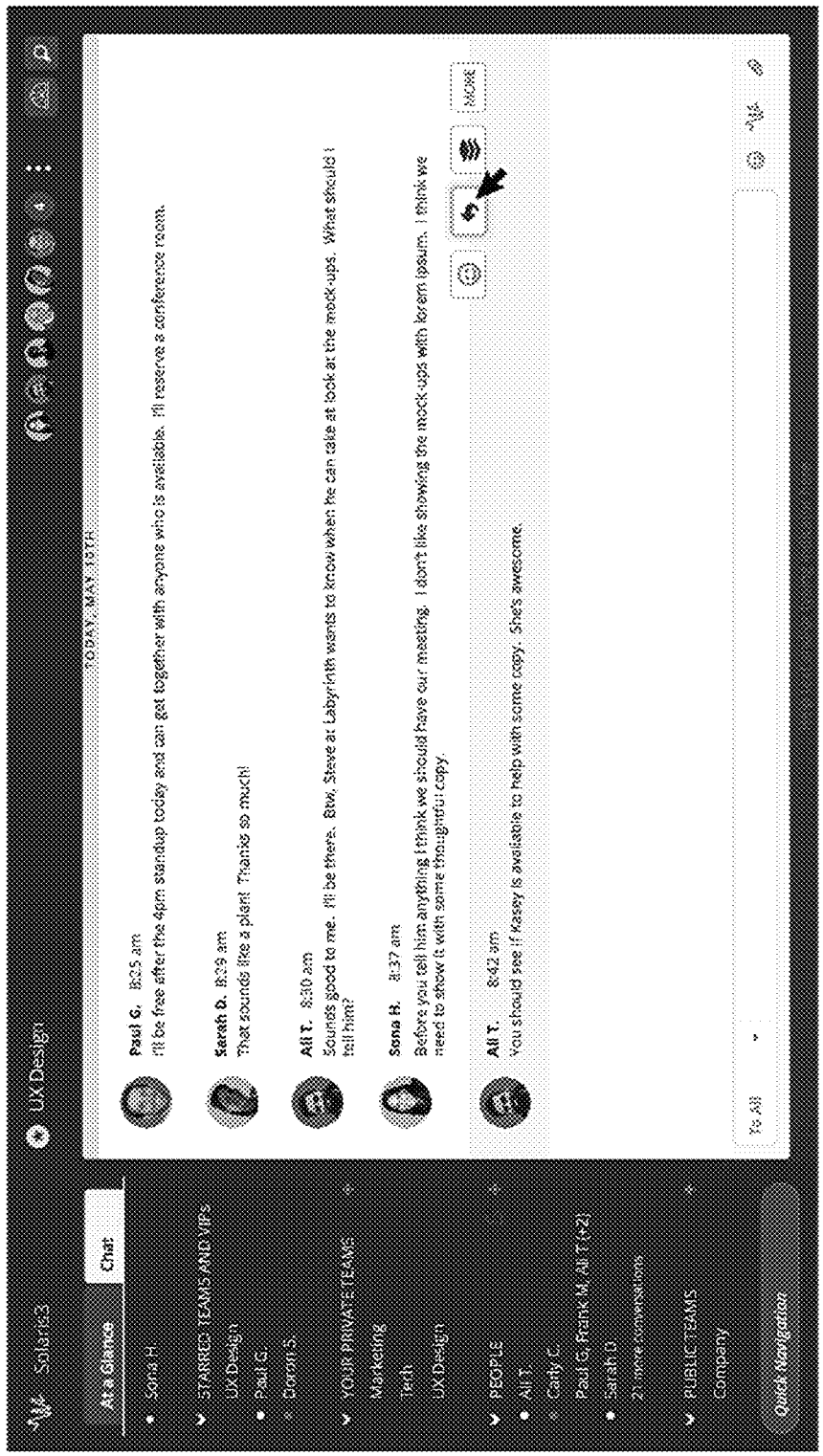
FIG. 10A-10I are screenshots that illustrate one or more exemplary embodiments of the present invention.
Figure 10B:
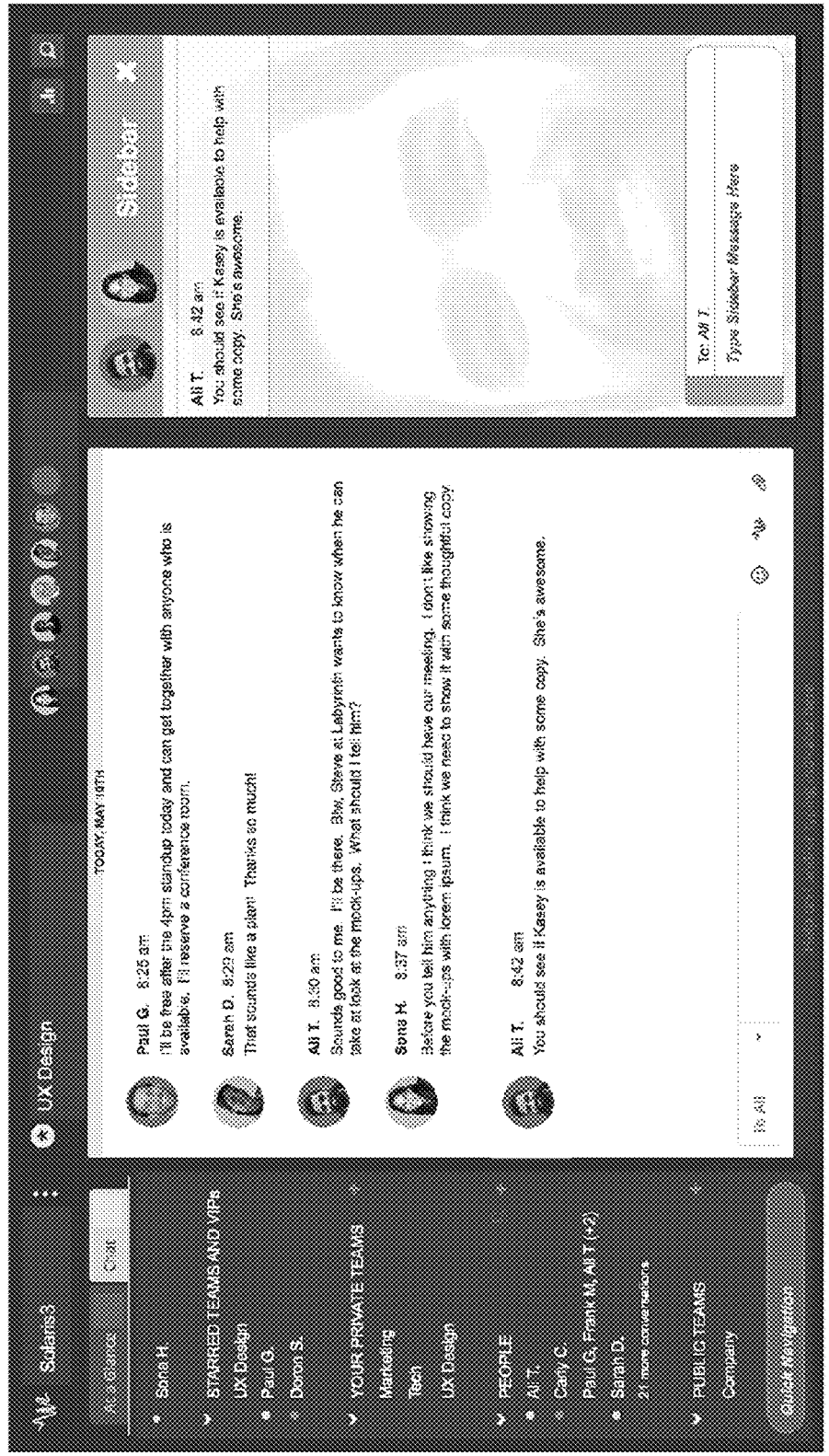
Figure 10C:
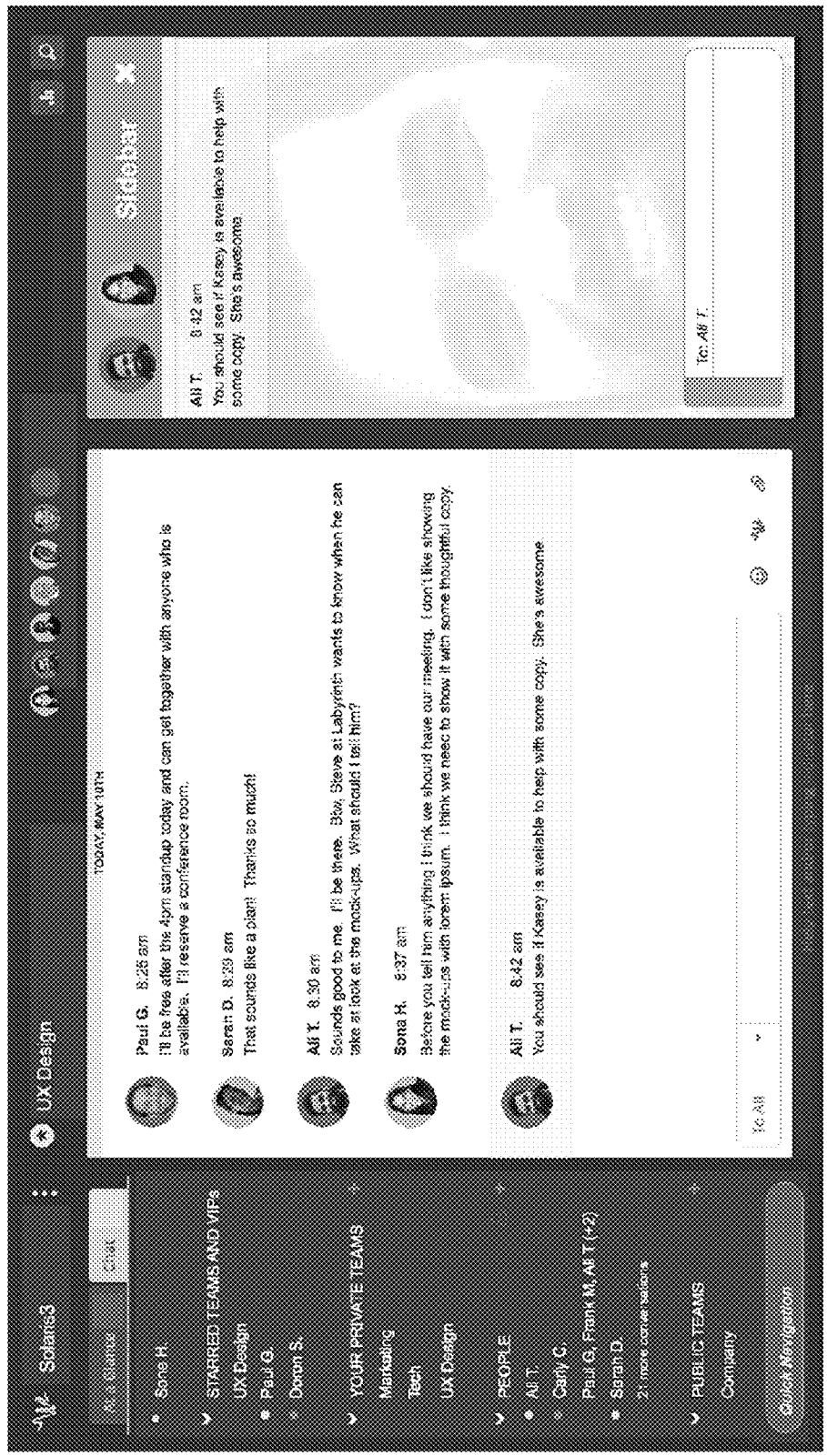
Figure 10D:
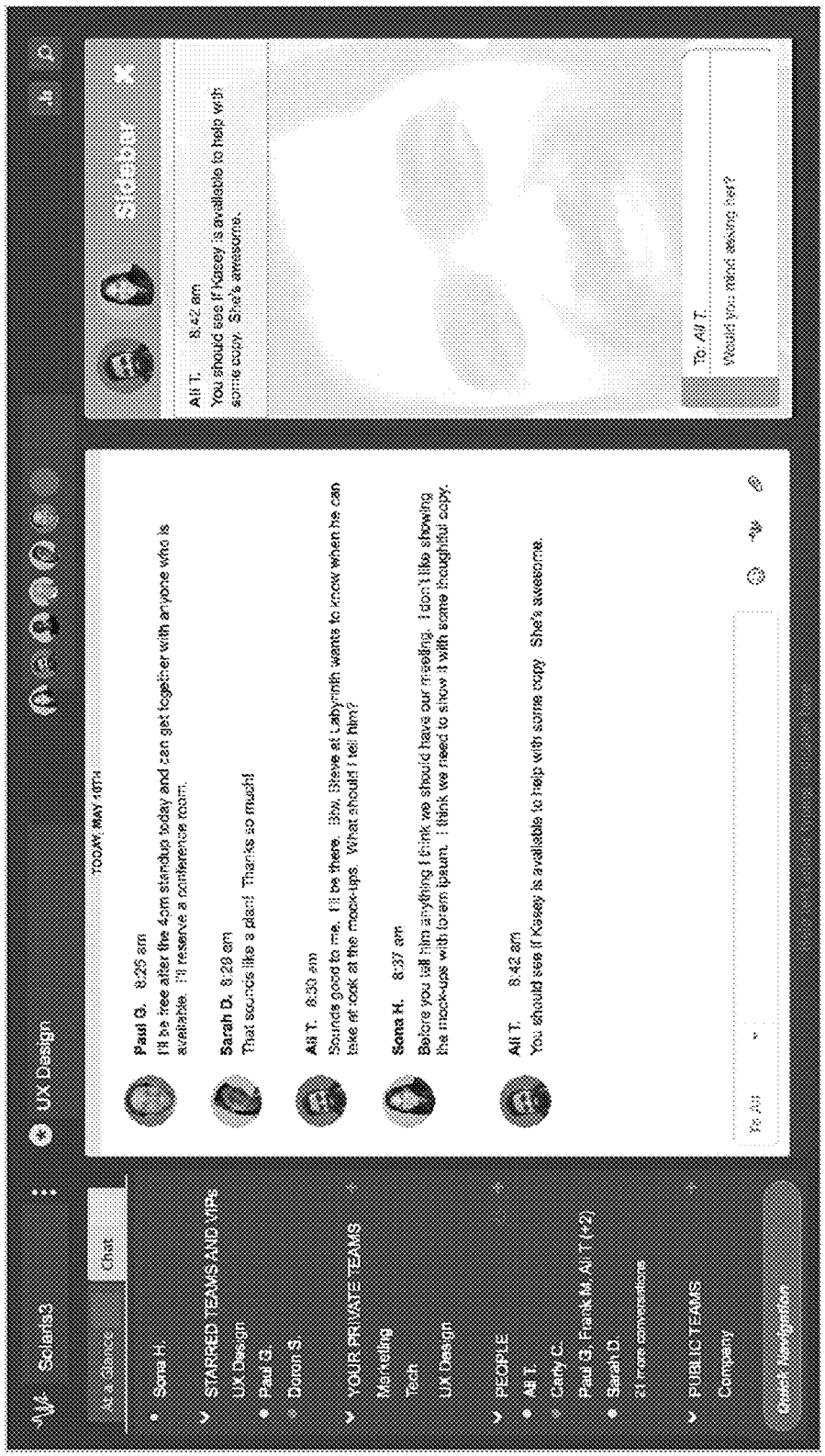
Figure 10E:
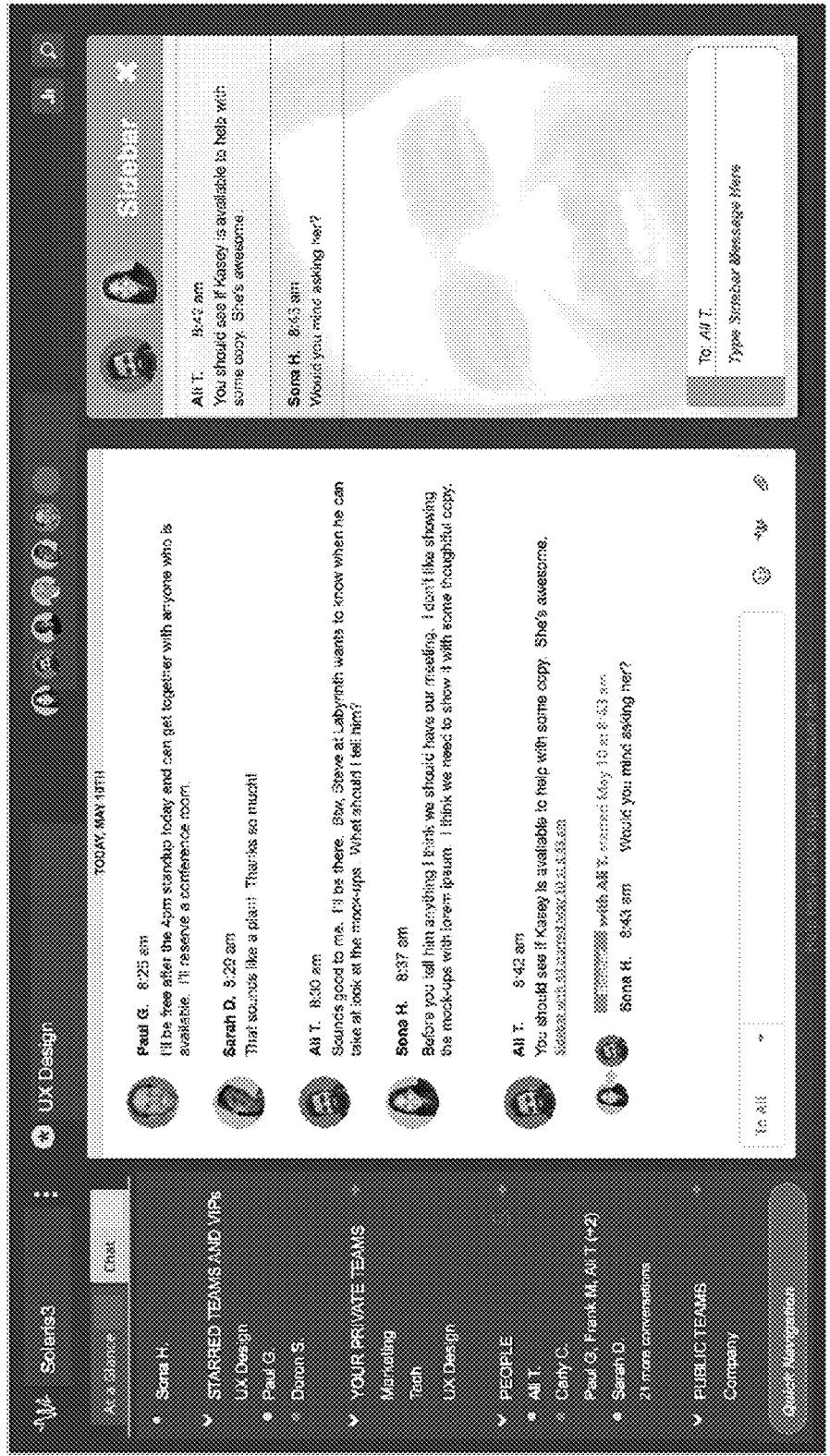
Figure 10F:
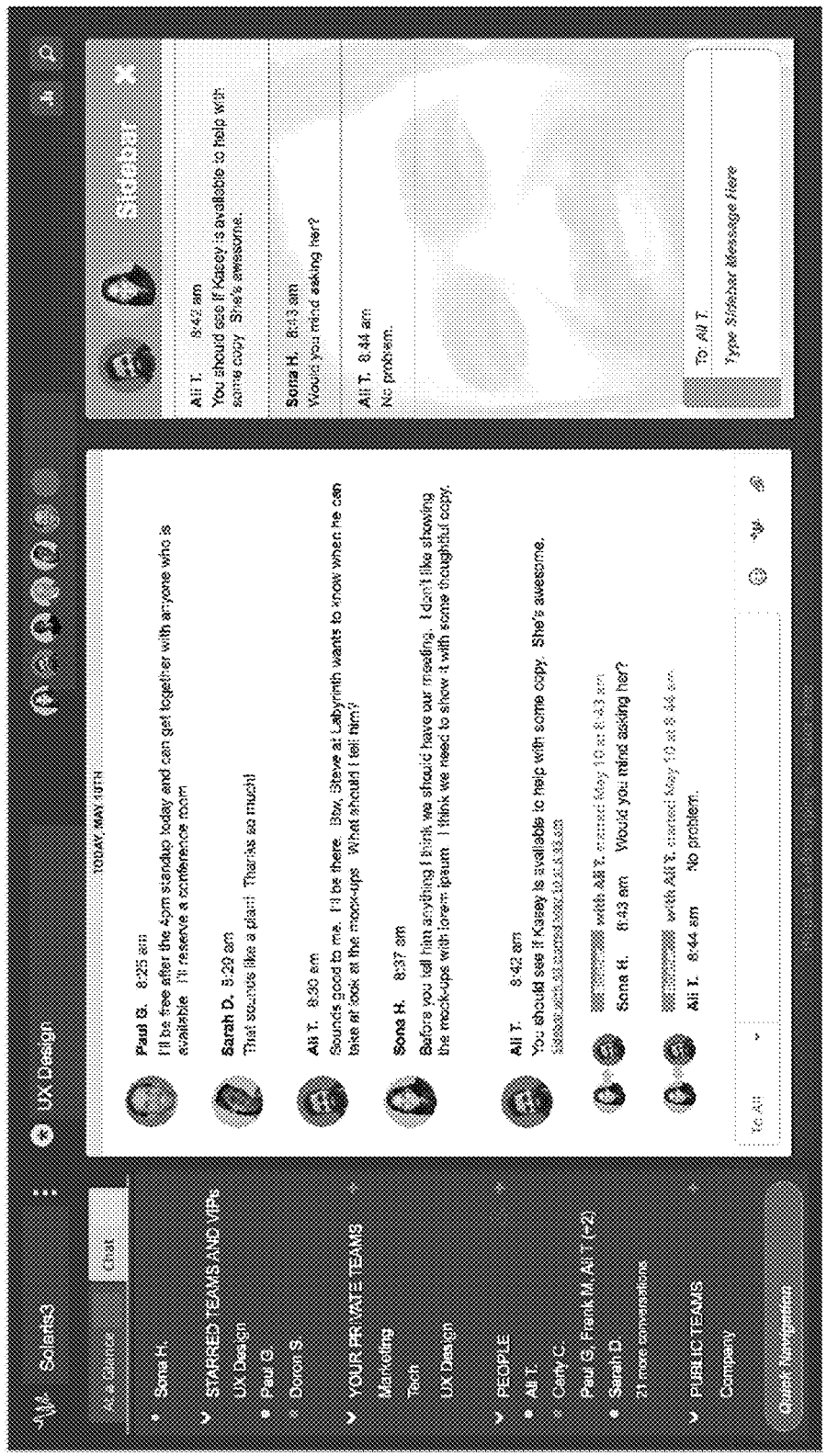
Figure 10G:
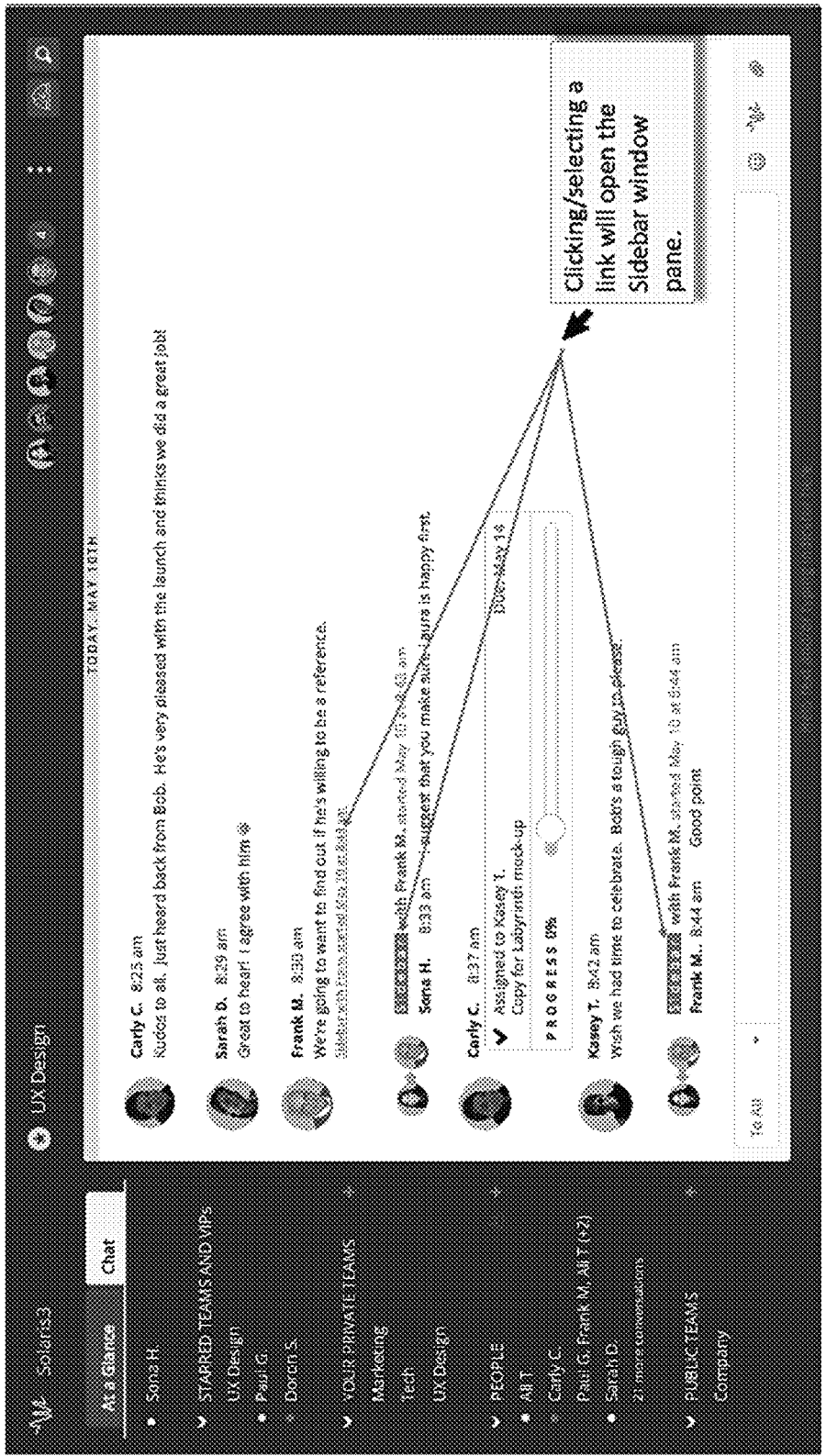
Figure 10H:
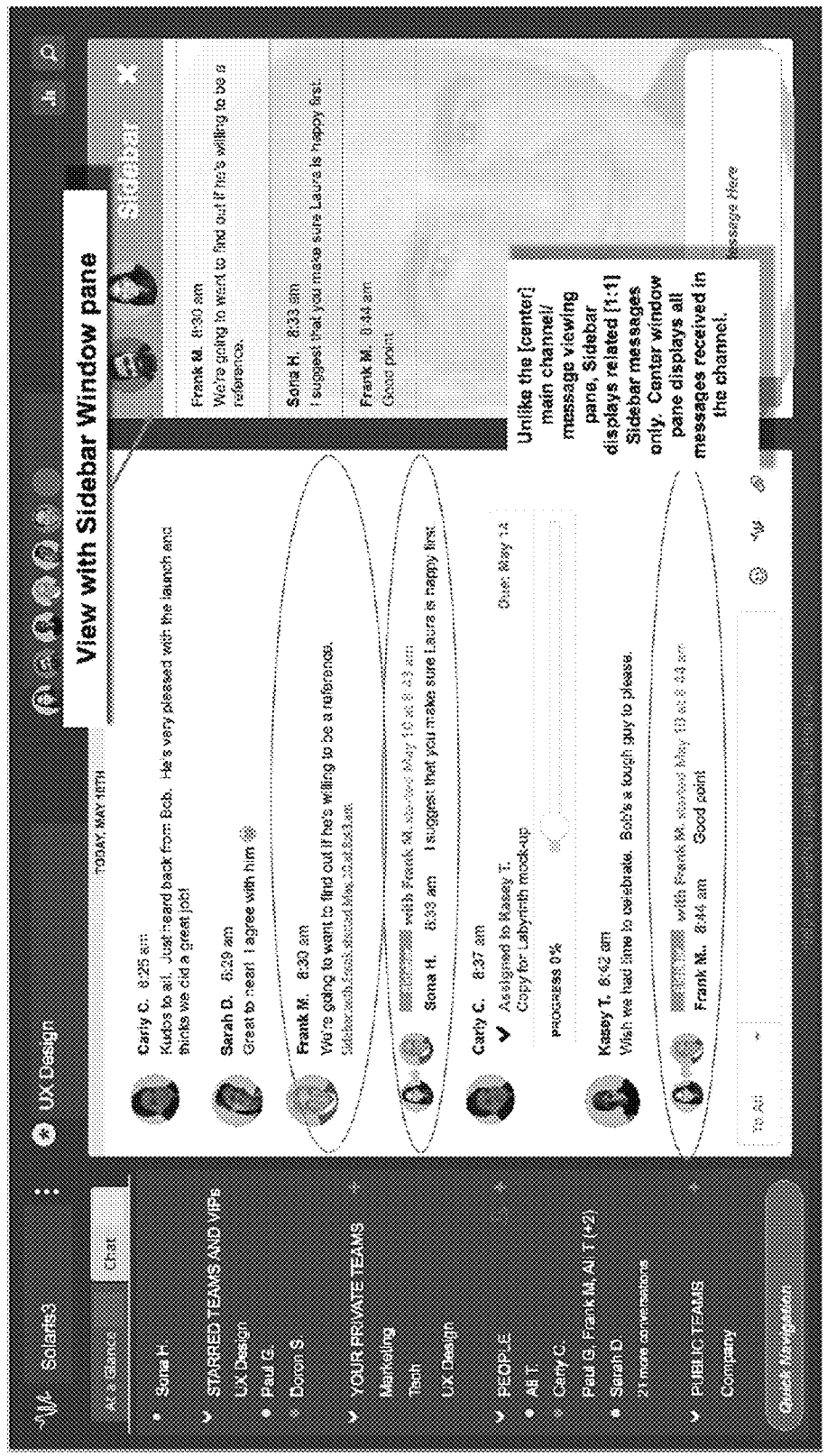
Figure 10I:
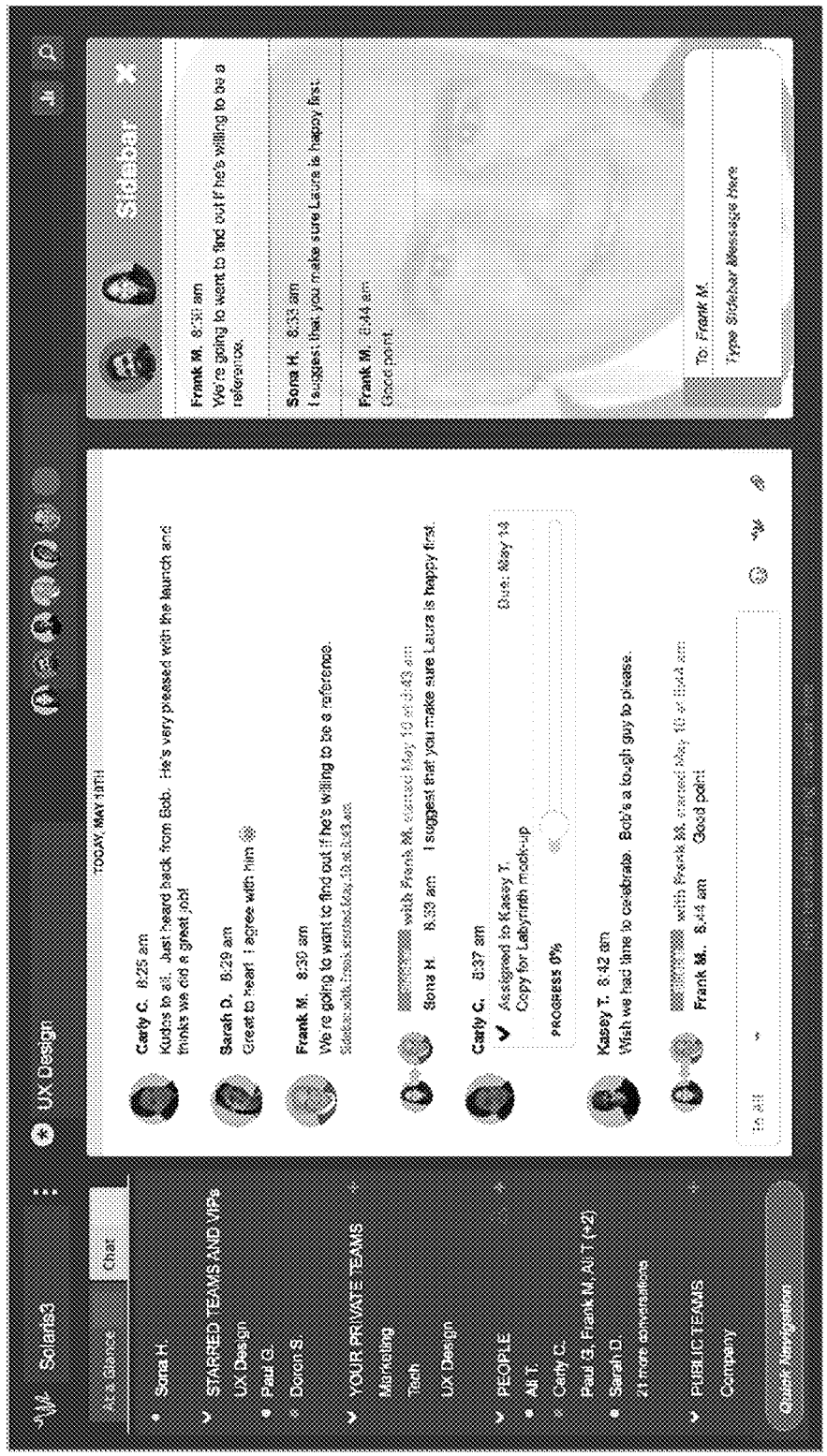

FIGS. 10A-10I are a plurality of screenshots that illustrate operation of an exemplary embodiment of the present invention. In FIG. 10A, a plurality of messages that are exchanged between a plurality of participants are displayed. For ease of identification, the messages that are exchanged between the plurality of participants are displayed in a portion of the screen that will be referred to as the main conversation pane. As in standard messaging, all participants of the messaging exchange in the main conversation pane are able to see each other's messages (which includes each other's responses to messages). In FIG. 10A, one of the participants to the message exchange (in this case, Sona, but it could be another participant) desires to have a private conversation with Ali. In this example, Sona and Ali will have a private 1:1 conversation, but in some exemplary embodiments the private conversation may be 1:N, N greater than 1, and the private conversation may exclude at least one person who is participating in the messaging that is displayed on the main conversation pane. Sona thus clicks on the exemplary "arrow" icon. Sona's action results in the message that was sent by Ali at 8:42 AM being designated an "anchor message." As shown in FIG. 10B, in an exemplary embodiment of the present invention, the act of designating Ali's message as an anchor message results in Ali's message being displayed in a separate pane (but this step is optional). For ease of identification, the separate pane displaying Ali's message will be referred to as a sidebar. As shown in FIG. 10B, a text message box appears with the words "type sidebar message here." In FIG. 10C, Sona begins to type a message that will be seen by Ali but will not be seen by the other participants to the messaging. In FIG. 10D, Sona types the message "would you mind asking her?" Upon pressing the enter key (or taking some other step that transmits the character just typed in) and as shown in FIG. 10E, Sona's response appears in the sidebar and is transmitted to Ali. Again, except for Ali and Sona, none of the other participants to the messaging in the main conversation pane see Sona's response. In FIG. 10F, Ali has typed his response to Sona, and Ali's response appears in the sidebar. Again, except for Ali and Sona, Ali's response is not seen by the other participants to the messaging in the main conversation pane. FIG. 10F illustrates that the conversation that appears in the sidebar can also (optionally) be displayed in the main conversation pane. For purposes of improving visual appearance, the messages that were entered in the sidebar and duplicated in the main conversation pane can be collapsed in the main conversation pane. FIG. 10G illustrates the main conversation pane with collapsed sidebar messages. Clicking/selecting one of the links corresponding to a collapsed sidebar message will open the sidebar and allow the conversation to continue in the sidebar (again limited to the participants in the conversation in the sidebar and excluding all other participants in the conversation in the main conversation pane). As shown in FIG. 10H, once a link to a particular message in the main conversation pane has been selected, the conversation associated with that link can continue in the sidebar. As shown in FIG. 10I, Ali is part of the conversation in the sidebar between Sona and Frank (while other participants of the conversation in the main conversation pane are excluded).

As shown, any participant to the conversation in the main conversation pane can respond to a message that has been designated as an anchor message, and the response can appear in the main conversation pane. The response to the anchor message that is entered into the main conversation pane ("a response) is visible to all other participants in the main conversation pane. Furthermore, a response to a message in the sidebar ("a further response") is seen by the participants participating in the sidebar conversation, but participants to the conversation in the main conversation pane that are not included in the sidebar conversation are excluded from seeing the message.

As shown in the figures, the anchor message and the response received to the anchor message in the main conversation pane may be simultaneously displayed. Furthermore, a response to the anchor message in the main conversation pane and a response to the message in the sidebar may be simultaneously displayed. As shown, the messages that appear in the main message pane are displayed one below the other. Furthermore, the messages displayed in the sidebar may be displayed one below the other.

While a non-transitory machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the disclosure. The term "machine-readable storage medium" shall accordingly be taken to include, but not be limited to, solid-state memories, and optical and magnetic media.

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "associating", "updating", "providing", "integrating", "selecting", "executing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method of providing messaging, said method comprising the steps of:
   a) providing display of messages exchanged between a plurality of participants, wherein said messages are displayed to each of said plurality of participants;
   b) receiving designation of one of said messages displayed to each of said plurality of participants as an anchor message;
   c) permitting a response received to said anchor message from one of said plurality of participants to be provided to and displayed by all others of said plurality of participants; and d) receiving at least a further response to said anchor message from at least one of said plurality of participants, wherein at least an excluded one of said plurality of participants is prevented from receiving and displaying at least said further response, and wherein said anchor message and said further response are both displayed to indicate that said further response is a response to said anchor message.

2. A method according to claim 1, wherein said anchor message and said response received to said anchor message are simultaneously displayed.

3. A method according to claim 1, further comprising the step of simultaneously displaying said response and at least said further response.

4. A method according to claim 1, wherein step c) includes the step of permitting all of said plurality of participants to exchange messages with each other.

5. A method according to claim 1, wherein said messages exchanged with all of said plurality of participants are displayed below each other as said messages are received.

6. A method according to claim 1, wherein step e) includes the step of exchanging a plurality of further messages between said plurality of participants except for said excluded one of said plurality of participants.

7. A method according to claim 5, wherein step e) includes the step of exchanging a plurality of further messages between said plurality of participants except for said excluded one of said plurality of participants.

8. A method according to claim 6, wherein the plurality of further messages are displayed below each other as said further messages are received.

9. A method according to claim 7, wherein the plurality of further messages are displayed below each other as said further messages are received.

10. Apparatus for providing messaging, said apparatus comprising:
   a. a memory for storing said messaging; and
   b. at least one processor for:
providing display of messages exchanged between a plurality of participants, wherein said messages are displayed to each of said plurality of participants;
receiving designation of one of said messages displayed to each of said plurality of participants as an anchor message;
permitting a response received to said anchor message from one of said plurality of participants to be provided to and displayed by all others of said plurality of participants;
providing display of said response; and
receiving at least a further response to said anchor message from at least one of said plurality of participants, wherein at least an excluded one of said plurality of participants is prevented from receiving and displaying at least said further response, and wherein said anchor message and said further response are both displayed to indicate that said further response is a response to said anchor message.

11. Apparatus according to claim 10, wherein said anchor message and said response received to said anchor message are simultaneously displayed.

12. Apparatus according to claim 10, wherein said at least one processor is further for simultaneously displaying said response and at least said further response.

13. Apparatus according to claim 10, wherein said permitting said response includes permitting all of said plurality of participants to exchange messages with each other.

14. Apparatus according to claim 10, wherein said messages exchanged with all of said plurality of participants are displayed below each other as said messages are received.

15. Apparatus according to claim 10, wherein said receiving at least said further response includes exchanging a plurality of further messages between said plurality of participants except for said excluded one of said plurality of participants.

16. Apparatus according to claim 14, wherein said receiving at least said further response includes exchanging a plurality of further messages between said plurality of participants except for said excluded one of said plurality of participants.

17. Apparatus according to claim 15, wherein the plurality of further messages are displayed below each other as said further messages are received.

18. Apparatus according to claim 16, wherein the plurality of further messages are displayed below each other as said further messages are received.

* * * * *